(12) United States Patent
Baba

(10) Patent No.: US 8,493,817 B2
(45) Date of Patent: Jul. 23, 2013

(54) ELECTRONIC TIMEPIECE

(75) Inventor: Norimitsu Baba, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 372 days.

(21) Appl. No.: 12/580,553

(22) Filed: Oct. 16, 2009

(65) Prior Publication Data

US 2010/0097896 A1    Apr. 22, 2010

(30) Foreign Application Priority Data

Oct. 20, 2008  (JP) .................................. 2008-269737

(51) Int. Cl.
*G04C 11/02* (2006.01)
*G04C 3/00* (2006.01)

(52) U.S. Cl.
USPC .............................. 368/47; 368/281; 368/205

(58) Field of Classification Search
USPC ........................... 368/10, 46, 47, 205, 88, 281
See application file for complete search history.

(56) References Cited

U.S. PATENT DOCUMENTS

| | | | |
|---|---|---|---|
| 6,411,569 B1 * | 6/2002 | Megner et al. ................... 368/43 | |
| 6,542,120 B1 | 4/2003 | Gilbertson | |
| 6,573,445 B1 * | 6/2003 | Burgers ......................... 136/256 | |
| 7,190,638 B2 * | 3/2007 | Oguchi ............................ 368/47 | |
| 7,391,677 B2 * | 6/2008 | Urano et al. ..................... 368/47 | |
| 2004/0137963 A1 * | 7/2004 | Barras et al. ................. 455/575.1 | |
| 2004/0155818 A1 * | 8/2004 | Barras et al. ........... 343/700 MS | |
| 2005/0195689 A1 * | 9/2005 | Oguchi ............................ 368/47 | |
| 2009/0229667 A1 * | 9/2009 | Shrotriya et al. .............. 136/263 | |
| 2010/0300507 A1 * | 12/2010 | Heng et al. .................... 136/244 | |

FOREIGN PATENT DOCUMENTS

| | | |
|---|---|---|
| EP | 1 522 908 A1 | 4/2005 |
| EP | 1 884 753 A1 | 2/2008 |
| JP | 7-87293 B2 | 9/1995 |
| JP | 11-112227 A | 4/1999 |
| JP | 2000-138607 | 5/2000 |
| JP | 2006-258704 | 9/2006 |
| JP | 4044898 | 11/2007 |
| WO | 03/005486 A1 | 1/2003 |

* cited by examiner

*Primary Examiner* — Vit W Miska

(57) ABSTRACT

An electronic timepiece that uses electrical power produced by photovoltaic generation as a power source and has a function for receiving microwave signals, including a dial for displaying time information on a front surface thereof, a solar cell that receives light passing through the dial and produces electrical power by photovoltaic generation, and an antenna that is disposed so that at least part of the signal receiving surface opposes at least a part of the back surface of the dial, and receives microwave signals through the dial. The solar cell is not disposed in space between the back side of the dial and the signal receiving surface of the antenna.

10 Claims, 17 Drawing Sheets

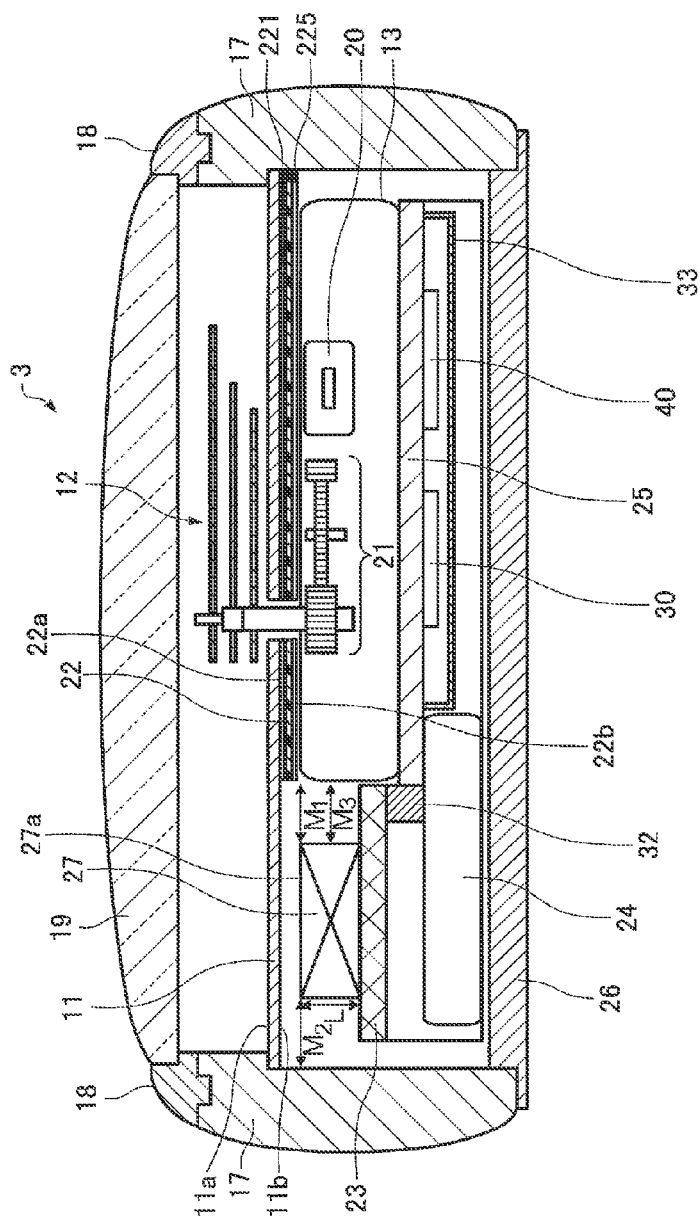
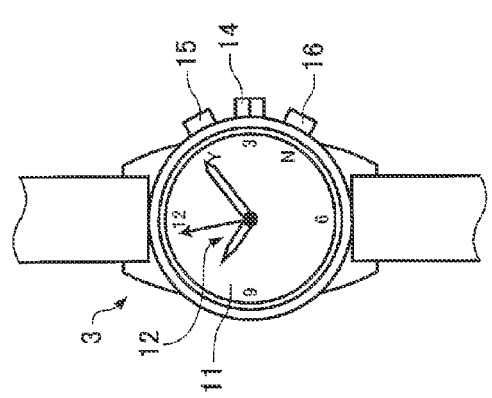
FIG. 7B
FIG. 7A

ANTENNA AREA

ANTENNA AREA

ELECTRONIC TIMEPIECE

CROSS-REFERENCE TO RELATED APPLICATION(S)

Japanese Patent application No. 2008-269737 is hereby incorporated by reference in its entirety.

BACKGROUND

1. Field of Invention

The present invention relates to an electronic timepiece that uses power produced by photovoltaic generation as a power source and has a function for receiving microwaves.

2. Description of Related Art

Electronic timepieces that receive microwave signals and acquire information superposed on a microwave carrier signal are being developed. For example, wristwatches have been developed that acquire the current position, date, and accurate time information by using the Global Positioning System (GPS), which is a system in which satellites (GPS satellites) orbiting the Earth on known orbits transmit microwave signals (satellite signals) carrying superposed time information and orbit information, and terrestrial receivers (GPS receivers) receive these microwave signals (satellite signals) to determine their own positions. Such wristwatches are taught in Japanese Unexamined Patent Appl. Pub. JP-A-2000-138607 and in Japan Patent No. 4044898.

A problem with the wristwatches taught in JP-A-2000-138607 and in Japan Patent No. 4044898, however, is that because the antenna is housed is a protrusion that can be seen from the outside, timepiece appearance and wearability are impaired and even the ease of use is a problem. A conceivable solution for such wristwatches is to make the dial from a material that passes microwaves and dispose the antenna on the back side of the dial in order to improve both the appearance and wearability.

Wristwatch-type radio-controlled timepieces that use electricity produced by photovoltaic generation by solar cells and receive 40-kHz or 60-kHz standard time signals are also known from the literature. Solar cells are generally designed so that the area to which light is incident is as large as possible in order to increase photovoltaic efficiency. As a result, in consideration of the appearance and wearability, the solar cell may be disposed so that the surface of the solar cell is opposite substantially the entire area of the back side of the dial in a wristwatch-type radio-controlled timepiece with a solar cell. This means that the standard time signal will be received through the solar cell if the antenna is disposed on the back side of the dial, but because the standard time signal is a long wave, low frequency signal, the solar cell has substantially no effect as a standard time signal shield and there is no effect on standard time signal reception performance.

However, because the shield effect of the solar cell to high frequency microwave signals is extremely strong and reception performance is thus degraded, there has been no attempt to render an electronic timepiece that receives microwaves with a solar cell while also disposing the antenna on the back side of the dial in order to improve appearance and wearability.

SUMMARY OF INVENTION

An electronic timepiece according to the present invention provides both a good appearance and wearability by disposing a solar cell and antenna on the back side of the dial while maintaining reliable microwave reception.

A first aspect of the invention is an electronic timepiece that uses electrical power produced by photovoltaic generation as a power source and has a function for receiving microwave signals, including a dial for displaying time information on a front surface thereof, a solar cell that receives light passing through the dial and produces electrical power by photovoltaic generation, and an antenna that is disposed so that at least part of the signal receiving surface opposes at least a part of the back surface of the dial, and receives microwave signals through the dial, and having the solar cell not disposed in space between the back side of the dial and the signal receiving surface of the antenna.

Microwaves generally have a wavelength of 100 µm to 1 m, and a frequency from 300 MHz to 3 THz, and include decimeter waves (UHF), centimeter waves (SHF), millimeter waves (EHF) and sub-millimeter waves. Signals that are used for GPS, Bluetooth, and CDMA (code division multiple access) are all microwaves. Electronic timepieces according to the invention thus include timepieces that receive and communicate using GPS, Bluetooth, and CDMA (code division multiple access) protocols.

The dial is preferably nonmetallic so that microwaves can pass therethrough. Furthermore, because the dial must also be able to pass light, the substrate may be made of plastic, and metal vapor deposition may be applied to the surface of the plastic to a thickness that does not attenuate microwaves. Time information such as the hour, minute, and second may also be displayed with an analog time display using a combination of hand positions and letters, numbers, symbols, or other markings formed on the surface of the dial, or time information such as the hour, minute, and second may be displayed by means of a digital time display on the surface of the dial.

Because an electronic timepiece according to the invention has the antenna disposed inside the electronic timepiece on the back side of the dial, an electronic timepiece with a good appearance and wearability can be provided.

Furthermore, because the solar cell is not disposed between the back of the dial and the signal receiving surface of the antenna in the electronic timepiece according to this aspect of the invention, microwaves will not be attenuated by the solar cell. An electronic timepiece according to the invention can therefore maintain reliable reception even if the solar cell is generating electrical power during reception.

In an electronic timepiece according to another aspect of the invention the solar cell has an open part formed in the space between the back side of the dial and the signal receiving surface of the antenna.

In an electronic timepiece according to another aspect of the invention the solar cell is disposed with at least a part of the light-receiving surface opposing at least a part of the back side of the dial.

In an electronic timepiece according to another aspect of the invention the light-receiving surface of the solar cell and the signal receiving surface of the antenna are disposed substantially on the same plane.

An electronic timepiece according to this aspect of the invention enables disposing the antenna to a position closer to the dial, thereby expanding the antenna radiation pattern and improving reception performance.

The electronic timepiece according to this aspect of the invention also provides greater freedom disposing other timepiece parts inside a wristwatch. As a result, the outside case can be made thinner and lighter by, for example, disposing the timepiece parts with the smallest possible gaps therebetween.

Another aspect of the invention is an electronic timepiece that uses electrical power produced by photovoltaic generation as a power source and has a function for receiving microwave signals, including a dial for displaying time information on a front surface thereof, a solar cell that is disposed with at least a part of the light-receiving surface opposing at least a part of the back side of the dial, receives light passing through the dial, and produces electrical power by photovoltaic generation, and an antenna that is disposed so that at least part of the signal receiving surface opposes at least a part of the back side of the light-receiving surface of the solar cell, and receives microwave signals through the solar cell, and the solar cell does not have electrodes formed at least in the part thereof disposed between the back side of the dial and the signal receiving surface of the antenna.

Because the part of the solar cell where electrodes are not formed has substantially no microwave shield effect compared with the parts where electrodes are formed, the microwaves are not attenuated by passing therethrough. Because the electronic timepiece according to the invention receives microwaves through the part where solar cell electrodes are not formed, reliable reception is possible.

In an electronic timepiece according to another aspect of the invention the distance between the antenna and metallic members contained in the solar cell is greater than or equal to a specified value.

As the distance between the antenna and metallic member of the solar cell decreases, electrical coupling and loss between the antenna and the metallic member increases. In addition, as the distance between the antenna and metallic member of the solar cell decreases, the radiation pattern of the antenna is shielded by the metallic member and becomes smaller, and the reception performance of the antenna deteriorates. However, because the distance between the antenna and metallic member of the solar cell is greater than or equal to a specified value in an electronic timepiece according to this aspect of the invention, reception performance does not deteriorate and microwaves can be reliably received.

Another aspect of the invention is an electronic timepiece that uses electrical power produced by photovoltaic generation as a power source and has a function for receiving microwave signals, including a dial for displaying time information on a front surface thereof, a solar cell that is disposed with at least a part of the light-receiving surface opposing at least a part of the back side of the dial, receives light passing through the dial, and produces electrical power by photovoltaic generation, and an antenna that is disposed so that at least part of the signal receiving surface opposes at least a part of the back side of the light-receiving surface of the solar cell, and receives microwave signals through the solar cell, and the electrode in at least the part of the solar cell disposed between the back side of the dial and the signal receiving surface of the antenna is formed with a mesh shape.

All electrodes of the solar cell may also be formed with a mesh configuration.

Because the solar cell electrode disposed between the back of the dial and the signal receiving surface of the antenna is mesh shaped in an electronic timepiece according to this aspect of the invention, the surface area of the electrode can be reduced. Because the microwave shield effect of the solar cell electrode can thus be weakened, microwaves can be reliably received through the solar cell.

The solar cell can be disposed so that the entire light-receiving surface of the solar cell opposes all of the back side of the dial in an electronic timepiece according to this aspect of the invention. By thus disposing the solar cell, the decorativeness of the timepiece can be improved when the transmittance of the dial is low because the color of the solar cell can be seen throughout the dial from the outside.

An electronic timepiece according to another aspect of the invention includes a timepiece part of which at least a part is made from a metallic member, the timepiece part being disposed so that the distance between the antenna and the timepiece part is greater than or equal to a specified value.

As the distance between the antenna and metallic member decreases, the electrical coupling and loss between the antenna and the metallic member increases. In addition, as the distance between the antenna and metallic member decreases, the radiation pattern of the antenna is blocked by the metallic member and becomes smaller, and the reception performance of the antenna deteriorates. However, because the antenna is disposed so that the distance to metallic members is greater than or equal to the specified value in an electronic timepiece according to this aspect of the invention, reception performance does not deteriorate and reception is reliable.

In an electronic timepiece according to another aspect of the invention the timepiece parts include an outside case member, a movement, and a back cover.

Because the antenna is disposed so that the distance to the metallic members rendering at least a part of the outside case member, movement, and back cover is greater than or equal to the specified value in an electronic timepiece according to this aspect of the invention, reliable reception is possible.

In an electronic timepiece according to another aspect of the invention the antenna is preferably a patch antenna (also commonly called a microstrip antenna).

Because an electronic timepiece according to this aspect of the invention uses a patch antenna that can receive circularly polarized waves, circularly polarized microwaves can be easily received. The microwave signals transmitted in the GPS system, for example, are circularly polarized waves.

In an electronic timepiece according to another aspect of the invention the antenna is a patch antenna, and the specified value is greater than or equal to the thickness of the antenna in the direction perpendicular to the signal receiving surface.

Because the antenna and the metallic member do not electrically couple and loss is not produced if the distance between the antenna and the metallic member is greater than or equal to the antenna thickness, there is substantially no drop in the reception performance of the antenna. The electronic timepiece according to another aspect of the invention can thus maintain reliable reception.

In an electronic timepiece according to another aspect of the invention the solar cell is disposed with the light-receiving surface opposing substantially all of the back side of the dial.

Because the dial must have a certain degree of transmittance in order for the solar cell to receive light passing through the dial, members disposed on the back side of the dial can be seen from the outside. In an electronic timepiece according to another aspect of the invention the solar cell is disposed so that the light-receiving surface of the solar cell is opposite the entire back side of the dial. Because the color of the solar cell can thus be seen over the entire area of the dial from the outside, decorativeness can be improved.

Furthermore, because the solar cell is disposed so that the light-receiving surface of the solar cell is opposite the entire back side of the dial in an electronic timepiece according to this aspect of the invention, the size of the light-receiving surface of the solar cell can be increased. As a result, the electrical generating efficiency of the solar cell can be increased.

In an electronic timepiece according to another aspect of the invention the antenna is disposed to at least a part of a peripheral part on the back side of the dial.

In an electronic timepiece according to another aspect of the invention the peripheral part is a peripheral part on the back side corresponding to an area from the 12:00 o'clock position to the 6:00 o'clock position on the face of the dial.

The peripheral part on the back side corresponding to an area from 12:00 o'clock to 6:00 o'clock on the front of the dial is the peripheral part on the back side of the dial corresponding to the area on approximately the right half on the front of the dial including the positions of the 12, 3, and 6.

When the electronic timepiece of the invention is worn on the user's left wrist when walking or running, for example, during everyday use, the radiation pattern of the antenna easily faces the sky where GPS satellites are present. The electronic timepiece of the invention is thus convenient because microwaves can be easily received.

In another aspect of the invention the microwave signals are satellite signals transmitted from a positioning information satellite, and the electronic timepiece also has a time adjustment information generating unit that acquires satellite information from a satellite signal received by the antenna and generates time adjustment information based on the satellite information, and a time information adjustment unit that adjusts the time information based on the time adjustment information.

The satellite information includes time information kept by a positioning information satellite and orbit information about the positioning information satellite, for example.

The time adjustment information is information that is needed to adjust the time kept by the electronic timepiece, and may be the time information kept by the positioning information satellite or time information calculated based on the time information, or time difference information that is calculated based on orbit information for a plurality of positioning information satellites.

BRIEF DESCRIPTION OF THE DRAWINGS

FIG. 7A is a plan view of a GPS wristwatch according to the first embodiment of the invention, and FIG. 7B is a schematic section view of the GPS wristwatch according to the first embodiment of the invention.

DESCRIPTION OF THE PREFERRED EMBODIMENTS

Preferred embodiments of the present invention are described below with reference to the accompanying figures. Note that the embodiments described below do not unduly limit the scope of the invention described in the accompanying claims. In addition, the invention does not necessary require all aspects of the configurations described below.

1. GPS System 1-1 Summary

Figure 1:
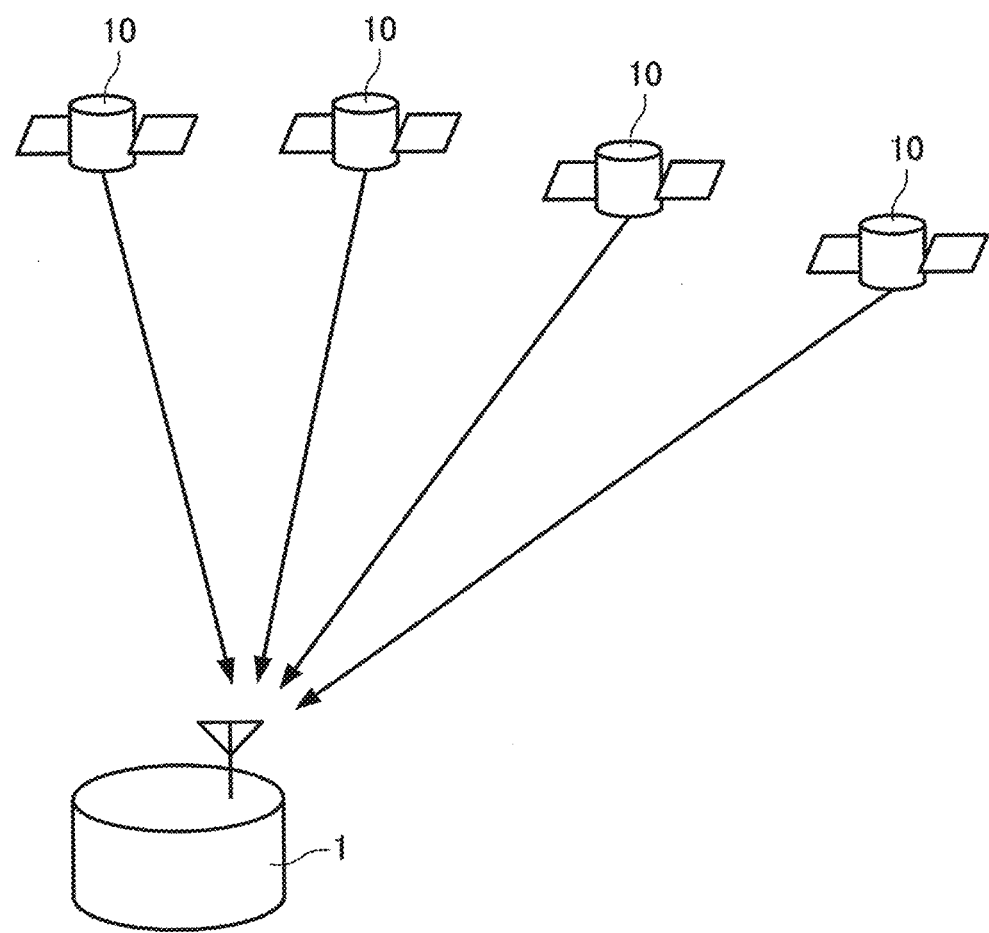
FIG. 1 schematically describes the GPS system.

FIG. 1 schematically describes a GPS system, which is a microwave communication system.

GPS satellites 10 orbit the Earth on specific known orbits and transmit navigation messages superposed to a 1.57542 GHz microwave carrier (L1 signal) to Earth. Note that a GPS satellite 10 is an example of a positioning information satellite in a preferred embodiment of the invention, and the 1.57542 GHz microwave carrier signal with a superposed navigation message (referred to below as the "satellite signal") is an example of a satellite signal in a preferred embodiment of the invention.

There are currently approximately 30 GPS satellites 10 in orbit, and in order to identify the GPS satellite 10 from which a satellite signal was transmitted, each GPS satellite 10 superposes a unique 1023 chip (1 ms period) pattern called a Coarse/Acquisition Code (CA code) to the satellite signal. The C/A code is an apparently random pattern in which each chip is either +1 or −1. The C/A code superposed to the satellite signal can therefore be detected by correlating the satellite signal with the pattern of each C/A code.

Each GPS satellite 10 has an atomic clock on board, and the satellite signal carries the extremely accurate time information (called the "GPS time information" below) kept by the atomic clock. The miniscule time difference of the atomic clock on board each GPS satellite 10 is measured by a terrestrial control segment, and a time correction parameter for correcting the time difference is also contained in the satellite signal. A GPS receiver 1 can therefore receive the satellite signal transmitted from one GPS satellite 10 and adjust the internally kept time to the correct time by using the GPS time information and time correction parameter contained in the received signal.

Orbit information describing the location of the GPS satellite 10 on its orbit is also contained in the satellite signal. The GPS receiver 1 can perform a positioning calculation using the GPS time information and the orbit information. This positioning calculation assumes that there is a certain amount of error in the internal time kept by the GPS receiver 1. More specifically, in addition to the x, y, and z parameters for identifying the three-dimensional position of the GPS receiver 1, the time difference is also an unknown value. As a result, a GPS receiver 1 generally receives satellite signals transmitted from four or more GPS satellites, and performs the positioning calculation using the GPS time information and orbit information contained in the received signals.

1-2 Navigation Message

Figure 2A:
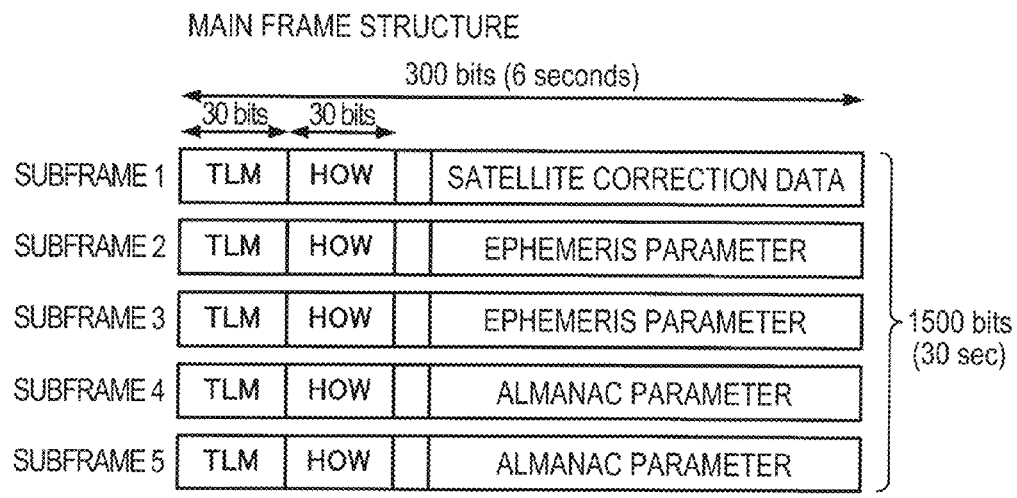
FIG. 2A to FIG. 2C describe the structure of the navigation message.
Figure 2B:
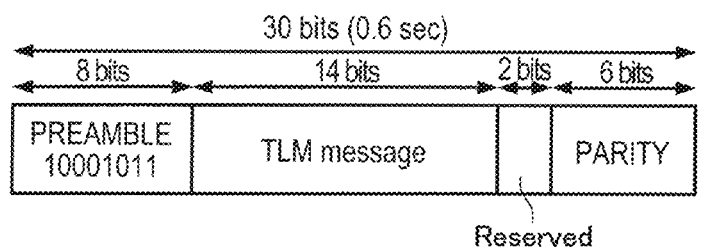
Figure 2C:
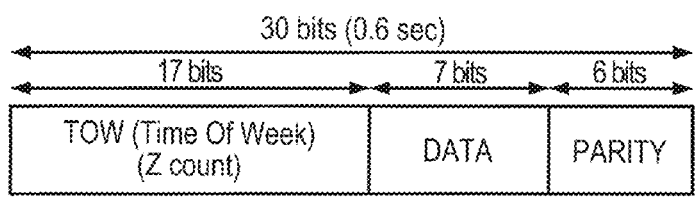

FIG. 2A to FIG. 2C describe the structure of the navigation message.

As shown in FIG. 2A, the navigation message is composed of data organized in a single main frame containing a total 1500 bits. The main frame is divided into five subframes of 300 bits each. The data in one subframe is transmitted in 6 seconds from each GPS satellite 10. It therefore requires 30 seconds to transmit the data in one main frame from each GPS satellite 10.

Subframe 1 contains satellite correction data such as the week number. The week number identifies the week to which the current GPS time information belongs. The GPS time starts at 00:00:00 on Jan. 6, 1980, and the number of the week that started that day is week number 0. The week number is updated every week.

Subframes 2 and 3 contain ephemeris data, that is, detailed orbit information for each GPS satellite 10. Subframes 4 and 5 contain almanac data (general orbit information for all GPS satellites 10 in the constellation).

Each of subframes 1 to 5 starts with a telemetry (TLM) word containing 30 bits of telemetry (TLM) data, followed by a HOW word containing 30 bits of HOW (handover word) data.

Therefore, while the TLM words and HOW words are transmitted at 6-second intervals from the GPS satellite 10, the week number data and other satellite correction data, ephemeris data, and almanac data are transmitted at 30-second intervals.

As shown in FIG. 2B, the TLM word contains preamble data, a TLM message, reserved bits, and parity data.

As shown in FIG. 2C, the HOW word contains GPS time information called the TOW or Time of Week (also called the Z count). The Z count denotes in seconds the time passed since 00:00 of Sunday each week, and is reset to 0 at 00:00 of Sunday each week. More specifically, the Z count denotes the time passed from the beginning of each week in seconds. The Z count denotes the GPS time at which the first bit of the next subframe data is transmitted. For example, the Z count transmitted in subframe 1 denotes the GPS time that the first bit in subframe 2 is transmitted.

The HOW word also contains 3 bits of data denoting the subframe ID (also called the ID code). More specifically, the HOW words of subframes 1 to 5 shown in FIG. 2A contain the ID codes 001, 010, 011, 100, and 101, respectively.

The GPS receiver 1 can get the GPS time information by acquiring the week number value contained in subframe 1 and the HOW words (Z count data) contained in subframes 1 to 5. However, if the GPS receiver 1 has previously acquired the week number and internally counts the time passed from when the week number value was acquired, the current week number value of the GPS satellite can be obtained without acquiring the week number from the satellite signal. The GPS receiver 1 can therefore know the current time, except for the date, once the Z count is acquired. The GPS receiver 1 therefore normally acquires only the Z count as the time information.

Note that the TLM word, HOW word (Z count), satellite correction data, ephemeris, and almanac parameters are examples of satellite information in the invention.

The GPS receiver 1 may be rendered as a wristwatch with a GPS device (referred to herein as a GPS wristwatch). A GPS wristwatch is an example of an electronic timepiece according to the present invention, and a GPS wristwatch according to this embodiment of the invention is described below.

2. GPS Wristwatch

2-1 Embodiment 1

GPS Wristwatch Circuit Configuration

Figure 3:
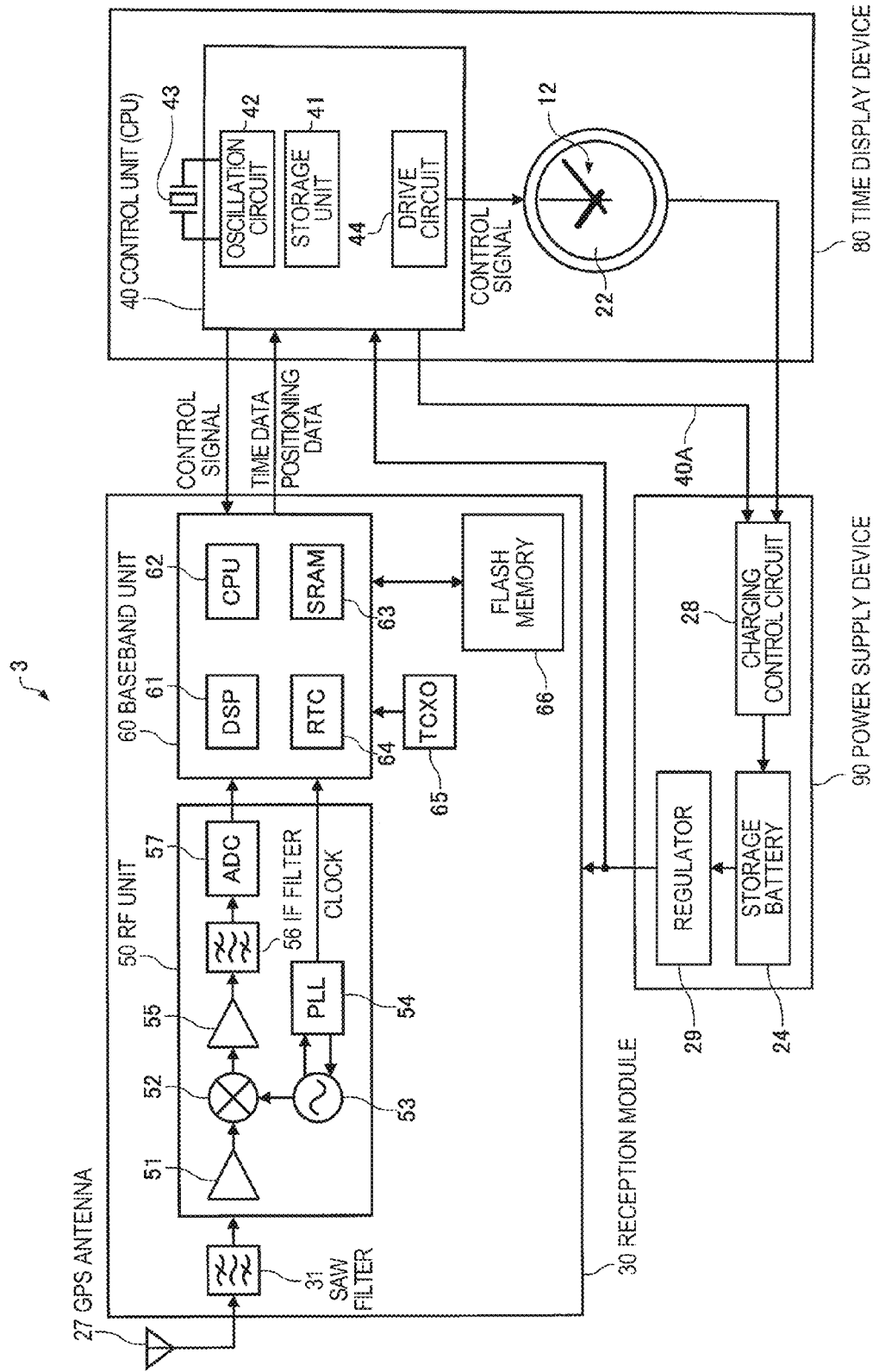
FIG. 3 describes the circuit configuration of a GPS wristwatch according to the first embodiment of the invention.

FIG. 3 describes the circuit configuration of a GPS wristwatch 3 according to a first embodiment of the invention.

The GPS wristwatch 3 is set to either a mode (referred to below as the "time mode") for receiving a satellite signal from at least one GPS satellite 10 and adjusting the internal time information, or a mode (referred to below as the "positioning mode") for receiving satellite signals from a plurality of GPS satellites 10, calculating the current position, and correcting the internal time information based on the time difference identified from the current position and the GPS time information. The GPS wristwatch 3 thus executes either a time adjustment process in the time mode or a time adjustment process (time difference correction process) in the positioning mode.

The GPS wristwatch 3 has a reception module 30, a GPS antenna 27, a time display device 80, and a power supply device 90.

Reception Module Configuration

The GPS antenna 27 is connected to the reception module 30. The GPS antenna 27 is an antenna that receives satellite signals from a plurality of GPS satellites 10.

The reception module 30 includes a SAW (surface acoustic wave) filter 31, RF (radio frequency) unit 50, and baseband unit 60. The SAW filter 31 executes a process that extracts a satellite signal from the signal received by the GPS antenna 27. More particularly, the SAW filter 31 is rendered as a bandpass filter that passes signals in the 1.5 GHz band.

As described below, the RF unit 50 and baseband unit 60 execute a process that acquires satellite information including orbit information and GPS time information contained in the navigation message from the 1.5 GHz satellite signal extracted by the SAW filter 31.

The RF unit 50 includes a low noise amplifier (LNA) 51, a mixer 52, a VCO (voltage controlled oscillator) 53, a PLL (phase locked loop) circuit 54, an IF (intermediate frequency) amplifier 55, and IF filter 56, and an A/D converter 57.

The satellite signal extracted by the SAW filter 31 is amplified by the LNA 51. The satellite signal amplified by the LNA 51 is mixed by the mixer 52 with a clock signal output from the VCO 53, and is down-converted to a signal in the intermediate frequency band. The PLL circuit 54 phase compares a reference clock signal and a clock signal obtained by frequency dividing the output clock signal of the VCO 53, and synchronizes the output clock signal of the VCO 53 to the reference clock signal. As a result, the VCO 53 can output a stable clock signal with the frequency precision of the reference clock signal. Note that a frequency of several megahertz can be selected as the intermediate frequency.

The signal mixed by the mixer 52 is then amplified by the IF amplifier 55. This mixing step of the mixer 52 generates a signal in the IF band and a high frequency signal of several gigahertz. As a result, the IF amplifier 55 amplifies the IF band signal and the high frequency signal of several gigahertz. The IF filter 56 passes the IF band signal and removes this high frequency signal of several gigahertz (or more particularly attenuates the signal to a specific level or less). The IF band signal passed by the IF filter 56 is then converted to a digital signal by the A/D converter 57.

The baseband unit 60 includes a DSP (digital signal processor) 61, CPU (central processing unit) 62, SRAM (static random access memory) 63, and RTC (real-time clock) 64. A TXCO (temperature-compensated crystal oscillator) 65 and flash memory 66 are also connected to baseband unit 60.

The TXCO 65 generates a reference clock signal of a substantially constant frequency irrespective of temperature.

Time difference information, for example, is stored in the flash memory 66. This time difference information is information defining the time difference in each of the plural regions into which geographical information is divided.

When the time mode or positioning mode is set, the baseband unit 60 demodulates the baseband signal from the digital signal (IF band signal) output by the A/D converter 57 of the RF unit 50.

In addition, when the time mode or positioning mode is set, the baseband unit 60 executes a process to generate a local code of the same pattern as each C/A code, and correlate the local code with the C/A code contained in the baseband signal, in the satellite search process described below. The baseband unit 60 also adjusts the output timing of the local code to achieve the peak correlation value to each local code, and when the correlation value equals or exceeds a threshold value, determines successful synchronization with the GPS satellite 10 matching that local code (that is, determines a lock on that the GPS satellite 10). Note that the GPS system uses a CDMA (code division multiple access) system enabling all GPS satellites 10 to transmit satellite signals at the same frequency using different C/A codes. Therefore, a GPS satellite 10 that can be captured can be found by evaluating the C/A code contained in the received satellite signal.

The baseband unit 60 mixes a local code having the same pattern as the C/A code of the captured GPS satellite 10 with the baseband signal, demodulates the navigation message, and acquires and stores satellite information, including the orbit information and GPS time information, that is contained in the navigation message to SRAM 63.

The orbit information and GPS time information contained in the navigation message are examples of the time adjustment information in the invention, and the reception module 30 functions as a time adjustment information generating unit in the invention.

Operation of the baseband unit 60 is synchronized to the reference clock signal output by the TXCO 65. The RTC 64 generates timing signals for processing the satellite signals. The RTC 64 counts up at the reference clock signal output from the TXCO 65.

Time Display Device Configuration

The time display device 80 includes a control unit (CPU) 40 and a crystal oscillator 43.

The control unit (CPU) 40 includes a storage unit 41, oscillation circuit 42, and drive circuit 44, and controls various operations.

The control unit (CPU) 40 controls the reception module 30. More specifically, the control unit (CPU) 40 sends control signals to the reception module 30 and controls the reception operation of the reception module 30.

The control unit (CPU) 40 also controls driving the hands 12 by means of an internal drive circuit 44.

The internal time information is stored in the storage unit 41. The internal time information is information about the time kept internally by the GPS wristwatch 3. The internal time information is updated by the reference clock signal generated by the crystal oscillator 43 and oscillation circuit 42. The internal time information can therefore be updated and moving the hands 12 can continue even when power supply to the reception module 30 has stopped.

When the time mode is set, the control unit (CPU) 40 controls operation of the reception module 30, corrects the internal time information based on the GPS time information and saves the corrected time in the storage unit 41. More specifically, the internal time information is adjusted to the UTC (Coordinated Universal Time), which is acquired by adding the UTC offset (the cumulative leap seconds, which is the difference between the GPS time and UTC and is currently −14 seconds) to the acquired GPS time information.

When the positioning mode is set, the control unit (CPU) 40 controls operation of the reception module 30, corrects the internal time information based on the GPS time information, the UTC offset parameter, and the time difference data acquired from the current position, and stores the corrected time in the storage unit 41. The control unit (CPU) 40 thus functions as a time information adjustment unit in the invention.

Power Supply Device Configuration

The power supply device 90 includes a charging control circuit 28, storage battery 24, regulator 29, and solar cell 22 included in the time display device 80.

The storage battery 24 supplies drive power to the reception module 30 and time display device 80, for example, through the regulator 29. Current produced by photovoltaic generation by the solar cell 22 is supplied through the charging control circuit 28 to the storage battery 24, and the storage battery 24 is thereby charged.

The charging control circuit 28 is connected between an electrode of the solar cell 22 and an electrode of the storage battery 24, and electrically connects or disconnects the electrode of the solar cell 22 and the electrode of the storage battery 24 based on the control signal 40A.

The time adjustment process (in the time mode) and the time difference adjustment process (in the positioning mode) of the GPS wristwatch 3 according to this first embodiment of the invention are described next.

Figure 4:
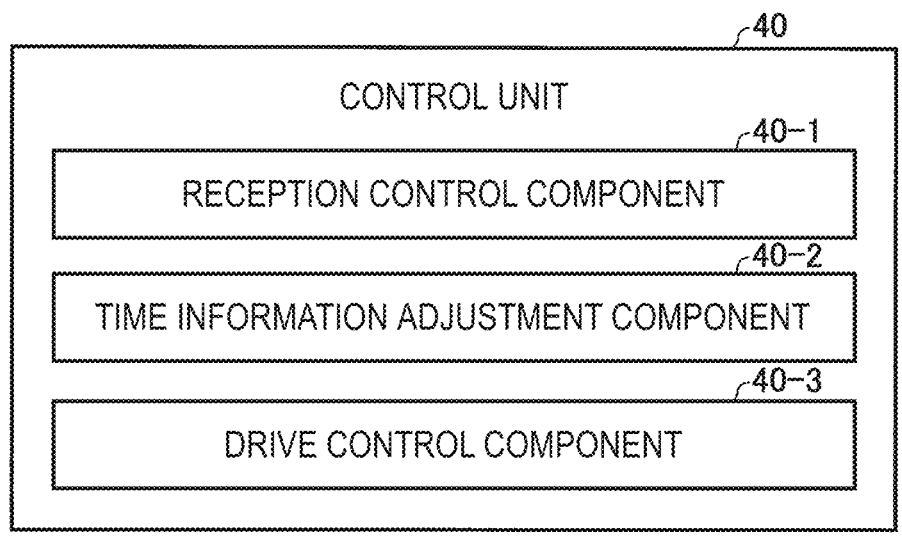
FIG. 4 describes the configuration of the control unit (CPU) 40 in a first embodiment of the invention.

The control unit (CPU) 40 can be rendered by dedicated devices that control these various processes, or by a device that executes these various control processes by executing control programs stored in the storage unit 41. More specifically, as shown in FIG. 4, the control unit (CPU) 40 functions as a reception control component 40-1, time information adjustment component 40-2, and drive control component 40-3 by executing an appropriate control program and running a time adjustment process (time mode) or time difference adjustment process (positioning mode).

Time Adjustment Process (Time Mode)

Figure 5:
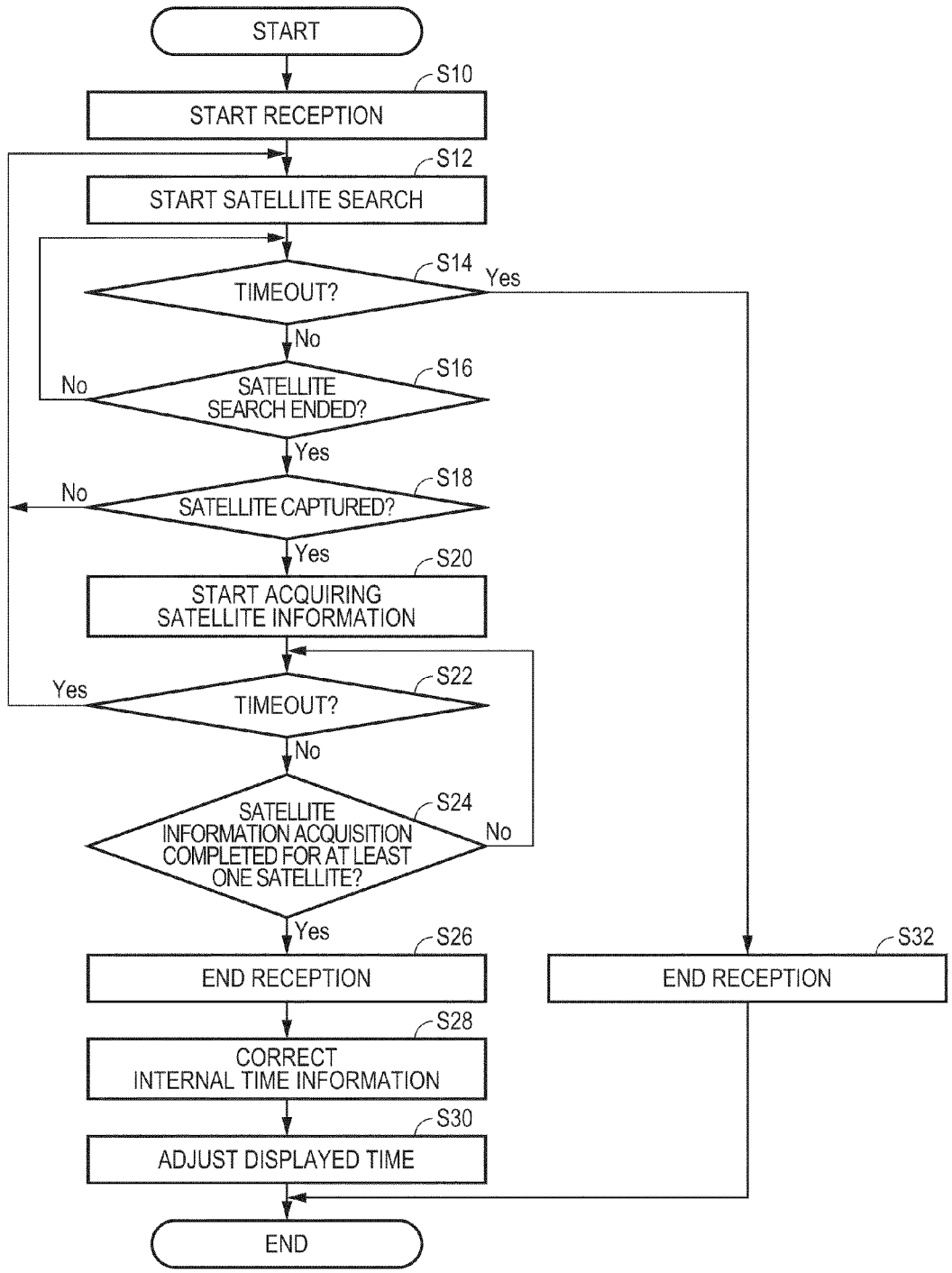
FIG. 5 is a flow chart describing an example of a time adjustment process in the first embodiment of the invention.

FIG. 5 is a flow chart showing an example of the time adjustment process (time mode) of a GPS wristwatch 3 according to a first embodiment of the invention.

The GPS wristwatch 3 executes the time adjustment process (time mode) shown in FIG. 5 when set to the time mode.

When the time adjustment process (time mode) starts, the GPS wristwatch 3 first controls the reception module 30 by means of the reception control component 40-1 to execute the reception process. More specifically, the reception control component 40-1 activates the reception module 30, and the reception module 30 starts receiving a satellite signal transmitted from a GPS satellite 10 (step S10).

The reception control component 40-1 then starts the satellite search process (satellite search step) (step S12). In the satellite search process the reception module 30 executes a process of finding GPS satellites 10 that can be captured.

More specifically, if there are, for example, thirty GPS satellites 10, the baseband unit 60 generates a local code with the same C/A code as the satellite number SV while changing the satellite number SV from 1 to 30. The baseband unit 60 then calculates the correlation between the local code and the C/A code contained in the baseband signal. If the C/A code contained in the baseband signal and the local code are the same, the correlation value will peak at a specific time, but if they are different codes, the correlation value will not have a peak and will always be substantially 0.

The baseband unit 60 adjusts the output timing of the local code so that the correlation value of the local code and the C/A code in the baseband signal goes to the peak, and determines that the GPS satellite 10 of the satellite number SV was captured if the correlation value is greater than or equal to the set threshold value. The baseband unit 60 then saves the information (such as the satellite number) of the captured GPS satellite 10 in SRAM 63.

Note that the code length of the local code is 1 ms, and a search for all of the GPS satellites 10 can be completed in approximately 2 seconds even when the search process looks for approximately 30 GPS satellites 10 by adjusting the output timing of the local code.

The reception control component 40-1 then determines if a time-out occurred based on whether or not the time passed since the satellite search started exceeds a predetermined specific time (such as 6 seconds) (step S14).

If the satellite search process has timed out (step S14 returns Yes), the reception control component 40-1 unconditionally ends the reception operation of the reception module 30 (step S32). If the GPS wristwatch 3 is in an environment where reception is not possible, such as some indoor locations, there is no GPS satellite 10 that can be captured even if the satellite search looks for all GPS satellites 10. Therefore, by unconditionally terminating the satellite search process for GPS satellites 10 when a capturable GPS satellite 10 cannot be found after the specified time has passed, the GPS wristwatch 3 according to this embodiment of the invention can reduce wasteful power consumption.

If the satellite search ends before timing out (step S16 returns Yes), the reception control component 40-1 determines if a GPS satellite 10 was captured (step S18).

If a GPS satellite 10 could not be captured (step S18 returns No), the reception control component 40-1 starts the satellite search process again (step S12).

If a GPS satellite 10 was captured (step S18 returns Yes), the reception control component 40-1 starts acquiring the satellite information (particularly the GPS time information) of the captured GPS satellite 10 (step S20).

More specifically, the baseband unit 60 executes a process of demodulating the navigation message from the captured GPS satellite 10 and acquiring the Z count data from three subframes. The baseband unit 60 then stores the acquired GPS time information in SRAM 63. If the Z counts acquired from the three subframes are all correct, satellite information acquisition ends.

If a time-out occurs before acquiring satellite information from one or more GPS satellites 10 ends (step S22 returns Yes), the reception control component 40-1 starts the satellite search step again. A time-out may occur, for example, if the satellite information from one or more GPS satellites 10 cannot be correctly demodulated because the reception level of the satellite signal from the GPS satellite 10 is low.

However, if acquisition of satellite information from one or more GPS satellites 10 is completed before operation times out (step S24 returns Yes), the reception control component 40-1 reads the satellite information (GPS time information) for at least one GPS satellite 10 from SRAM 63 and ends the reception operation of the reception module 30 (step S26).

The time information adjustment component 40-2 then corrects the internal time information stored in the storage unit 41 based on the GPS time information acquired from the reception module 30 (step S28).

Finally, the drive control component 40-3 controls the drive circuit 44 based on the corrected internal time information to adjust the displayed time (step S30).

Time Difference Adjustment Process (Positioning Mode)

Figure 6:
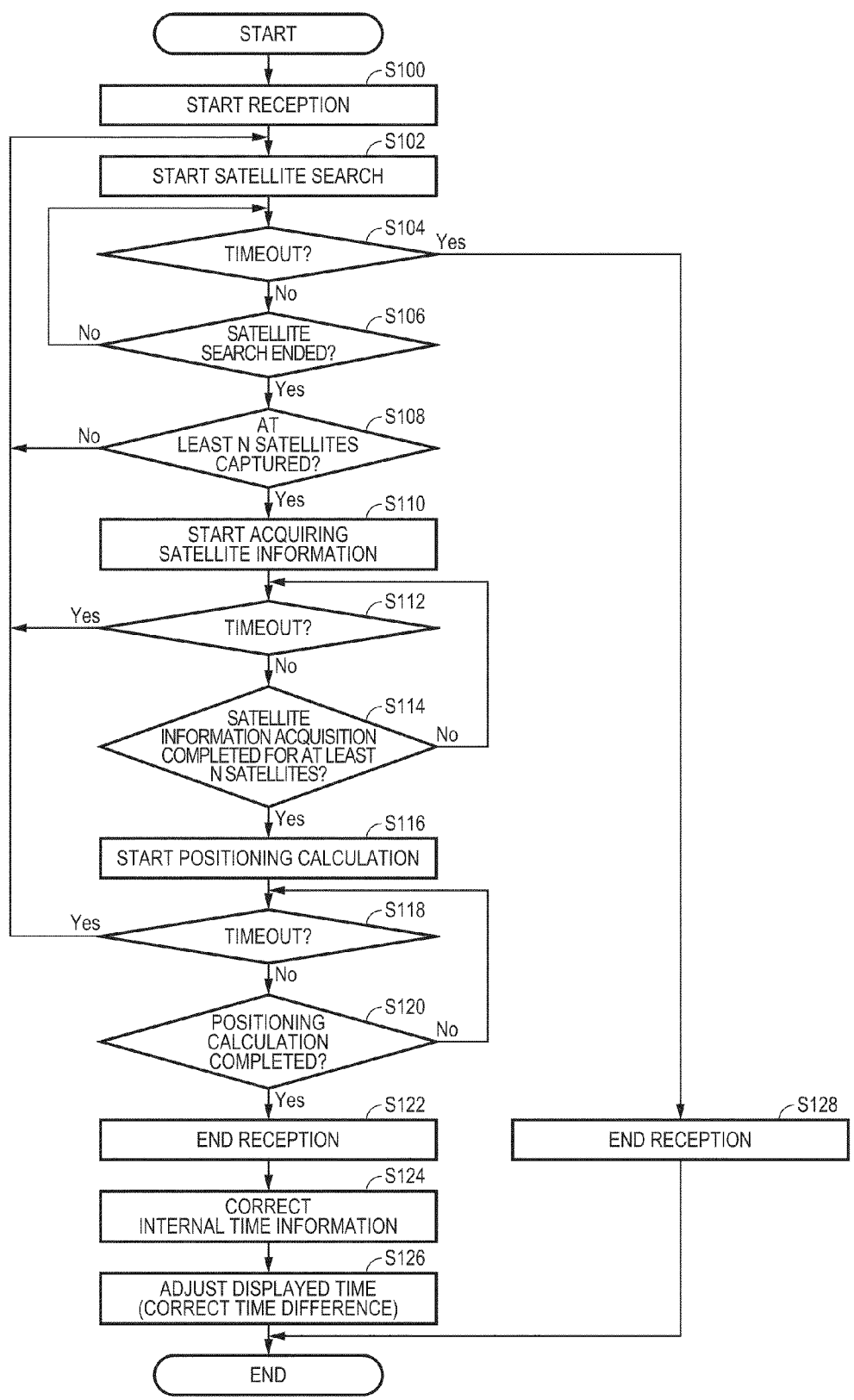
FIG. 6 is a flow chart describing an example of a time difference adjustment process in the first embodiment of the invention.

FIG. 6 is a flow chart showing an example of the time difference adjustment process (positioning mode) of a GPS wristwatch 3 according to a first embodiment of the invention. Note that further description of processes identical to steps in the time adjustment process (time mode) described above is omitted or simplified below.

The GPS wristwatch 3 executes the time difference adjustment process (positioning mode) shown in FIG. 6 when set to the positioning mode.

When the time difference adjustment process (positioning mode) starts, the GPS wristwatch 3 first controls the reception module 30 by means of the reception control component 40-1 to execute the reception process. More specifically, the reception control component 40-1 activates the reception module 30, and the reception module 30 starts receiving a satellite signal transmitted from a GPS satellite 10 (step S100).

The reception control component 40-1 then starts the satellite search process (satellite search step) (step S102).

The reception control component 40-1 then determines if a time-out occurred based on whether or not the time passed since the satellite search started exceeds a predetermined specific time (such as 6 seconds) (step S104).

If the satellite search process has timed out (step S104 returns Yes), the reception control component 40-1 unconditionally ends the reception operation of the reception module 30 (step S128).

If the satellite search ends before operation times out (step S106 returns Yes), the reception control component 40-1 determines if at least a specific number (N) of GPS satellites 10 were captured (step S108). The three unknown values of x, y, and z must be determined in order to calculate the location (x, y, z) of the GPS wristwatch 3 in three-dimensional space. This means that in order to calculate the three-dimensional location (x, y, z) of the GPS wristwatch 3, GPS time information and orbit information is required from three or more GPS satellites 10. In addition, because the time difference between the GPS time information and the internal time information of the GPS wristwatch 3 is another unknown value that is needed to improve the positioning precision, GPS time information and orbit information is needed from four or more GPS satellites 10.

If N (where N=4, for example) or more GPS satellites 10 could not be captured (step S108 returns No), the reception control component 40-1 starts the satellite search step again (step S102).

However, if N (where N=4, for example) or more GPS satellites 10 were captured (step S108 returns Yes), the reception control component 40-1 starts acquiring the satellite information (particularly the GPS time information and orbit information) of the captured GPS satellites 10 (step S110). More specifically, the reception control component 40-1 demodulates the navigation messages from each of the captured GPS satellites and acquires the transmitted Z count data and ephemeris data. The baseband unit 60 then saves the acquired GPS time information and orbit information in SRAM 63.

If operation times out before satellite information is acquired from N (such as 4) or more GPS satellites 10 (step S112 returns Yes), the reception control component 40-1 starts the satellite search step again (step S102). Operation may time out, for example, if satellite information from N (such as 4) or more GPS satellites 10 cannot be correctly demodulated because the reception level of satellite signals from the GPS satellites 10 is low.

However, if acquisition of satellite information from N (such as 4) or more GPS satellites 10 is completed before operation times out (step S114 returns Yes), the baseband unit 60 selects a group of N (such as 4) GPS satellites 10 from among the captured GPS satellites 10 and starts the positioning calculation (step S116).

More specifically, the baseband unit 60 reads the satellite information (GPS time information and orbit information) for the selected N (such as 4) GPS satellites 10 from SRAM 63, calculates the position, and outputs the positioning information (the longitude and latitude of the position where the GPS wristwatch 3 is located).

The baseband unit 60 then references the time difference information stored in flash memory 66, and acquires the time difference of the position where the GPS wristwatch 3 is located based on the positioning information and the positioning error. The baseband unit 60 ends the positioning calculation if the time difference data can be acquired.

If operation times out before the positioning calculation ends (step S118 returns Yes), the reception control component 40-1 starts the satellite search step again (step S102).

However, if the positioning calculation is completed before operation times out (step S120 returns Yes), the reception control component 40-1 reads the time difference data and the GPS time information for at least one GPS satellite 10 from SRAM 63, and then ends the reception operation of the reception module 30 (step S122).

The time information adjustment component 40-2 then corrects the internal time information stored in the storage unit 41 based on the time difference data and the GPS time information acquired from the reception module 30 (step S124).

Finally, the drive control component 40-3 controls the drive circuit 44 based on the corrected internal time information to adjust the time display (time difference) (step S126).

Construction of a GPS Wristwatch

FIG. 7A and FIG. 7B are figures describing the configuration of a GPS wristwatch 3 according to a first embodiment of the invention. FIG. 7A is a schematic plan view of the GPS wristwatch 3, and FIG. 7B is a schematic section view of the GPS wristwatch 3 shown in FIG. 7A.

As shown in FIG. 7A, the GPS wristwatch 3 has a dial 11 and hands 12. The hands 12 include a second hand, minute hand, and hour hand, and are driven through a wheel train by means of a stepping motor.

The GPS wristwatch 3 can be set to the time mode or the positioning mode by manually operating the crown 14, button 15 (A button), or button 16 (B button), for example.

For example, if button 15 (A button) is pressed for several seconds (such as 3 seconds) or longer, the GPS wristwatch 3 executes the time adjustment process in the time mode. If button 16 (B button) is pressed for several seconds (such as 3 seconds) or longer, the GPS wristwatch 3 executes the time adjustment process (time difference adjustment process) in the positioning mode.

If button 15 (A button) is pressed for a short time, the GPS wristwatch 3 displays the reception result from the last time mode by means of the dial 11 and hands 12. If button 16 (B button) is pressed for a short time, the GPS wristwatch 3 displays the reception result from the last positioning mode by means of the dial 11 and hands 12.

For example, if reception is successful, the second hand moves to the "Y" position (that is, pointing to the 2 (the 10-second position) on the dial), but if reception fails, the second hand moves to the "N" position (that is, pointing to the 4 (the 20-second position) on the dial).

The GPS wristwatch 3 can also regularly (automatically) enter the time mode or positioning mode to adjust the time.

As shown in FIG. 7B, the GPS wristwatch 3 has an outside case 17 that is made of stainless steel, titanium, or other metal.

The outside case 17 is basically cylindrically shaped, and a crystal 19 is attached to the opening on the face side of the outside case 17 by an intervening bezel 18. The bezel 18 is made from a non-metallic material such as ceramic in order to improve satellite signal reception performance. A back cover 26 is attached to the opening on the back side of the outside case 17.

Inside the outside case 17 are disposed a movement 13, a solar cell 22, a GPS antenna 27, and a storage battery 24.

The movement 13 includes a stepping motor and wheel train 21. The stepping motor has a motor coil 20, a stator and a rotor, and drives the hands 12 through an intervening wheel train.

A circuit board 25 is disposed on the back cover side of the movement 13, and the circuit board 25 is connected through a connector to an antenna circuit board 23 and the storage battery 24.

The reception module 30 including a reception circuit for processing satellite signals received through the GPS antenna 27, and the control unit (CPU) 40 that controls driving the stepping motor, for example, are mounted on the circuit board 25. The reception module 30 and control unit (CPU) 40 are covered by a shield plate 33, and are driven by power supplied from the storage battery 24.

The battery 24 is a lithium-ion battery or other type of rechargeable storage battery, and is rendered to store power generated by the solar cell 22. More particularly, the solar cell 22 produces electrical power by photovoltaic generation and the storage battery 24 is charged by electrically connecting an electrode of the solar cell 22 and an electrode of the storage battery 24. Note that this embodiment of the invention uses a lithium ion battery or other secondary battery as the storage battery 24, but a capacitor or other type of electrical storage device may be used as the storage battery 24.

The solar cell 22 is disposed so that the front side 22a through which light is received (the side on top in FIG. 7B) faces part of the back side 11b (that is, the surface on the opposite side as the front (time display surface) 11a) of the dial 11, and produces electrical power by photovoltaic generation using the light that passes through the crystal 19 and the dial 11.

Because the dial 11 can be seen from the outside, a low transmittance material is preferably used to improve the appearance while passing as much light as possible. The dial 11 is therefore preferably made of a non-metallic material such as plastic or glass that passes light.

The GPS antenna 27 mounted on the antenna circuit board 23 is an antenna for receiving satellite signals from a plurality of GPS satellites 10, and may be a patch antenna, helical antenna, chip antenna, or inverted F-type antenna, for example. Note that because the 1.57542-GHz microwave signal transmitted from the GPS satellite 10 is a circularly polarized wave, the GPS antenna 27 is preferably rendered using a patch antenna that can receive circularly polarized waves.

In order to improve the appearance and wearability of the GPS wristwatch 3, this embodiment of the invention renders the GPS antenna 27 on the back side 11b of the dial 11. As a result, the dial 11 is preferably made from a material that passes microwave signals in the 1.5 GHz band, such as plastic, glass, or other non-metallic material with low electrical conductivity and transmittance.

The GPS antenna 27 receives microwave signals (satellite signals) from the entire top and side surface areas. Therefore, so that metal members in the solar cell 22 do not block the microwaves, the solar cell 22 is not disposed between the back side 11b of the dial 11 and the reception surface 27a of the GPS antenna 27 (the top surface as seen in FIG. 7B).

However, the GPS antenna 27 and the metal members inside the solar cell 22 become electrically coupled when the distance between the GPS antenna 27 and the solar cell 22 is short, and loss occurs. The shorter the distance between the GPS antenna 27 and solar cell 22, the greater the radiation pattern of the GPS antenna 27 is blocked by the solar cell 22, and the smaller the radiation pattern of the GPS antenna 27 becomes. In addition, because the transparent electrode 221 and metal electrode 225 components of the solar cell 22 are configured using metal members, the high conductivity transparent electrode 221 and metal electrode 225 in the solar cell are major contributors to degraded reception performance. The distance $M_1$ between the GPS antenna 27 and the transparent electrode 221 and metal electrode 225 of the solar cell 22 is therefore controlled to be greater than or equal to a specified value so that reception performance does not deteriorate.

The GPS antenna 27 is also disposed so that the distance to other metal members is greater than or equal to a specified value in order to prevent electrical coupling with metal members other than the solar cell 22 and the resulting loss, to prevent other metallic members from blocking or reducing the radiation pattern of the GPS antenna 27, and to prevent a drop in the reception performance of the GPS antenna 27. For example, if the case 17 and movement 13 are composed of metallic members, the GPS antenna 27 is disposed so that the distance $M_2$ to the case 17 and the distance $M_3$ to the movement 13 are both greater than or equal to a specified distance.

Note that if a patch antenna is used and the distance from the GPS antenna 27 to the transparent electrode 221 and metal electrode 225 of the solar cell 22 or to other metal members is greater than or equal to the thickness L in the direction perpendicular to the reception surface 27a, there will be substantially no drop in the reception performance of the antenna because there will be no electrical coupling with the GPS antenna 27 or the resulting loss. As a result, distances $M_1$, $M_2$, and $M_3$ are preferably greater than or equal to the thickness L of the GPS antenna 27 in the direction perpendicular to the reception surface 27a.

While this produces a space between the GPS antenna 27 and the case 17 and movement 13, a spacer for securing other parts may be disposed in this space. The spacer is made from a non-metallic material that will not affect reception performance.

Figure 8A:
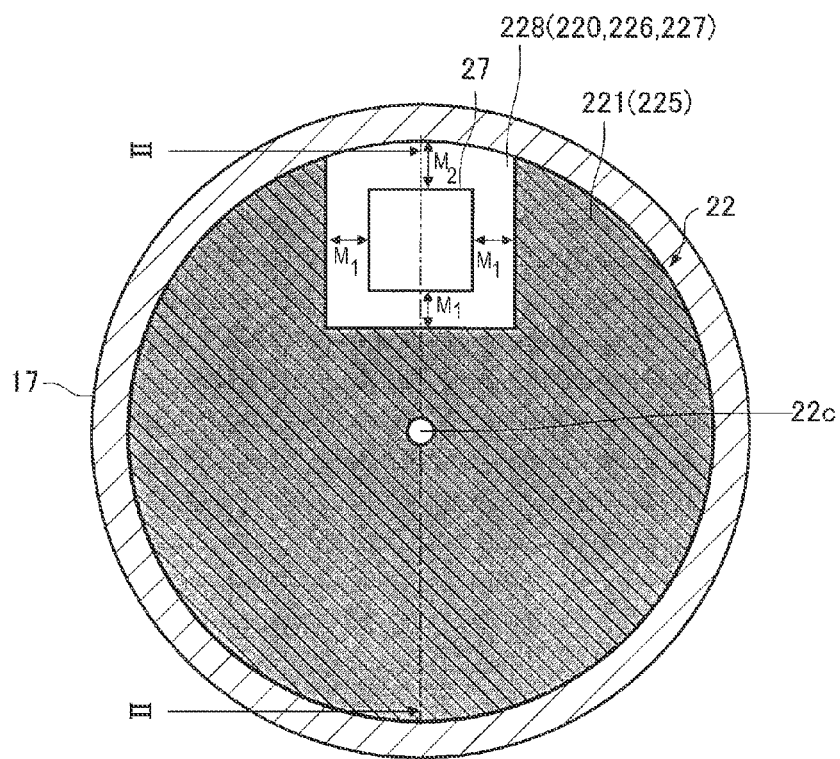
FIG. 8 describes the structure of a solar cell 22 in the first embodiment of the invention.
Figure 8B:
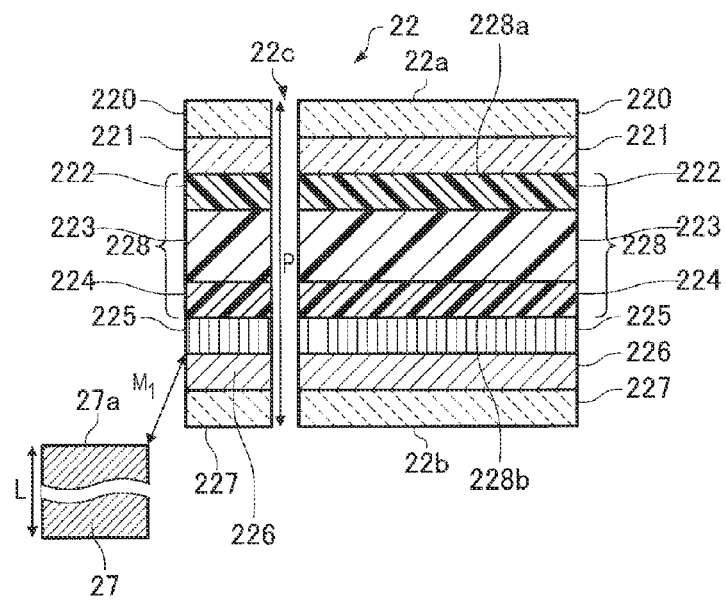

FIG. 8A and FIG. 8B describe the configuration of the solar cell 22 in a GPS wristwatch 3 according to the first embodiment of the invention. FIG. 8A shows the solar cell 22 from the direction in which light is incident (the top in FIG. 7B). FIG. 8B is a section view through line II-II of the solar cell 22 shown in FIG. 8A. Note that for illustration purposes the vertical enlargement ratio is greater than the horizontal enlargement ratio in FIG. 8B, but the approximate thickness P of an actual solar cell 22 is several micrometers, and the thickness L of the GPS antenna 27 and the distance $M_1$ between the GPS antenna 27 and the metal electrode 225 of the solar cell 22 are approximately several millimeters.

As shown in FIG. 8A and FIG. 8B, the solar cell 22 has an opening 22c through which the stem of the hands 12 passes. Note that if the GPS wristwatch 3 is a digital wristwatch there are no hands 12 and the opening 22c can therefore be omitted, but because the digital display unit is disposed on the back side of the solar cell 22 a separate opening is required so that the digital display can be seen from the outside.

As shown in FIG. 8A and FIG. 8B, the solar cell 22 is structured with an amorphous silicon layer 228 formed on a plastic film circuit board 226 and covered by protective films 220 and 227. The amorphous silicon layer 228 is formed with an i-type semiconductor 223 sandwiched between a p-type semiconductor 222 and an n-type semiconductor 224. The transparent electrode 221 and the metal electrode 225 are respectively formed on the front 228a (the surface facing the back side 11b of the dial 11 in FIG. 7B) and the back 228b (the surface facing the movement 13 in FIG. 7B) of the amorphous silicon layer 228.

The plastic film circuit board 226 may be made from a metal material. When the plastic film circuit board 226 is made from a metal material, the plastic film circuit board 226 is disposed so that the distance to the GPS antenna 27 is at least the specified value described above.

When light passing the protective film 220 and transparent electrode 221 is incident to the front 228a of the amorphous silicon layer 228, light energy produces electrons and holes in the i-type semiconductor 223. The resulting electrons and holes move to the p-type semiconductor 222 and the n-type semiconductor 224, respectively. As a result, current flows to the external circuit connected to the transparent electrode 221 and the metal electrode 225. The solar cell 22 thus produces electrical power by photovoltaic generation.

Because the solar cell 22 includes a transparent electrode 221 and a metal electrode 225 made from metal materials as described above and the solar cell 22 has a strong microwave shield effect, the solar cell 22 is not disposed between the back side 11b of the dial 11 and the reception surface 27a of the GPS antenna 27 (the top side as seen in FIG. 8B) in this embodiment of the invention so that microwaves are not blocked by the solar cell 22.

In addition, to improve microwave reception performance, or, more specifically, in order to suppress electrical coupling between the GPS antenna 27 and the transparent electrode 221 and metal electrode 225 of the solar cell 22 or the case 17 and the loss resulting from such coupling, and in order to prevent a drop in the reception performance of the GPS antenna 27 as a result of the radiation pattern of the GPS antenna 27 being blocked by the transparent electrode 221 and metal electrode 225 of the solar cell 22 and the case 17 and the radiation pattern of the GPS antenna 27 shrinking, the GPS antenna 27 is disposed so that the distance $M_1$ to the transparent electrode 221 and metal electrode 225 of the solar cell 22 and the distance $M_3$ to the case 17 are greater than or equal to the specified value.

It should be noted that if the color and appearance of the surface of the solar cell 22 are visible from the outside, the decorativeness of the GPS wristwatch 3 is not sufficient. Therefore, as shown in FIG. 7B, the solar cell 22 is disposed on the side facing the back side 11b of the dial 11 so that it cannot be seen from the outside.

Figure 9:
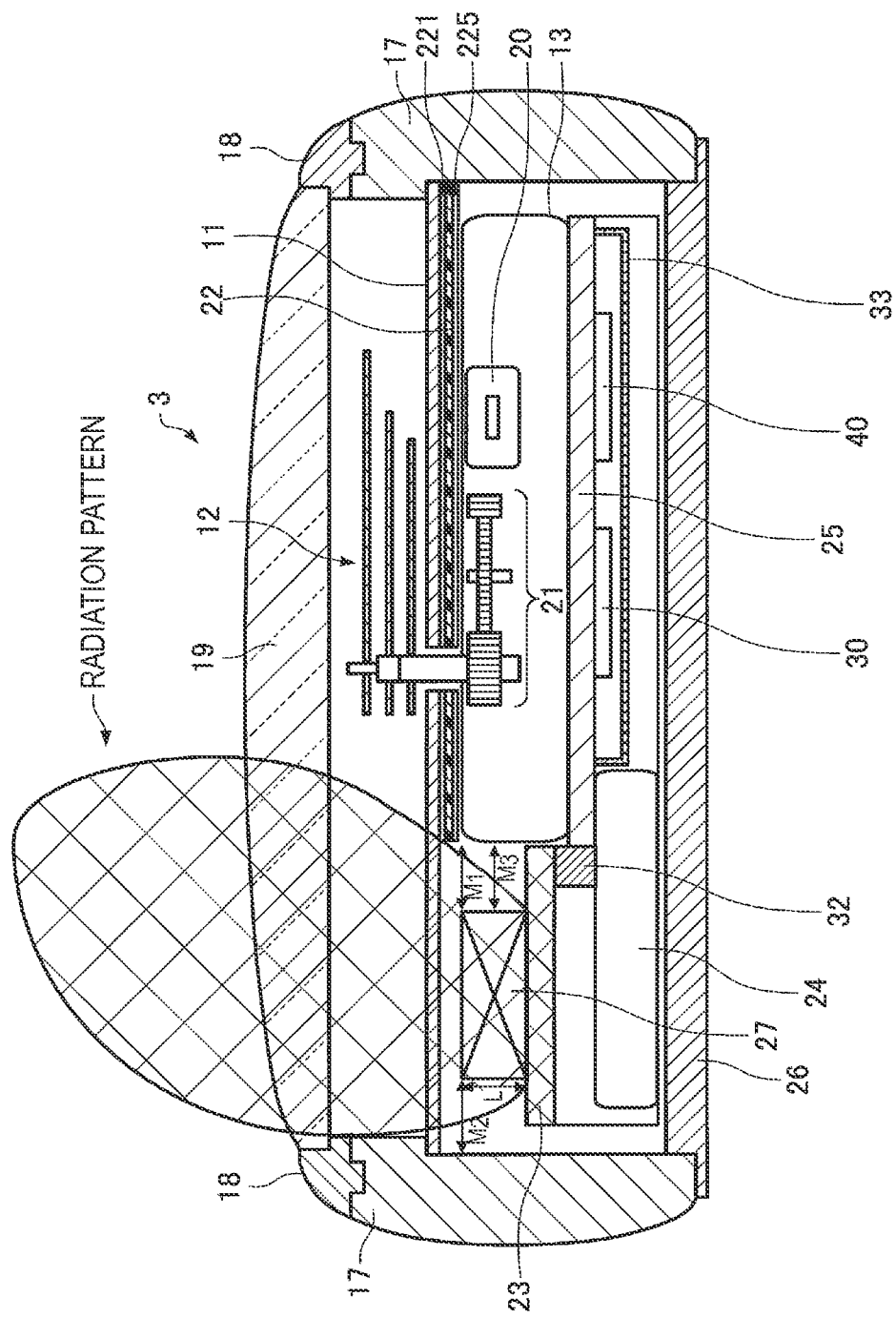
FIG. 9 shows an example of the radiation pattern of the GPS antenna 27 in the first embodiment of the invention.

FIG. 9 describes the radiation pattern of the GPS antenna 27 in a GPS wristwatch 3 according to the first embodiment of the invention.

The radiation pattern of the GPS antenna 27 is blocked by the transparent electrode 221 and metal electrode 225 of the solar cell 22 and by the case 17. As a result, as the distance $M_1$ between the GPS antenna 27 and the transparent electrode 221 and metal electrode 225 of the solar cell 22 and the distance $M_2$ between the GPS antenna 27 and the case 17 become shorter, the radiation pattern of the GPS antenna 27 becomes smaller and the reception performance of the GPS antenna 27 deteriorates. Therefore, in order to reduce the drop in reception performance, the GPS wristwatch 3 according to the first embodiment of the invention disposes the GPS antenna 27 so that the distance $M_1$ to the transparent electrode 221 and metal electrode 225 of the solar cell 22 and the distance $M_2$ to the case 17 is greater than or equal to a specified value. Distances $M_1$ and $M_2$ are preferably determined based on test measurement data in order to ensure the reception performance of the GPS antenna 27.

Figure 10A:
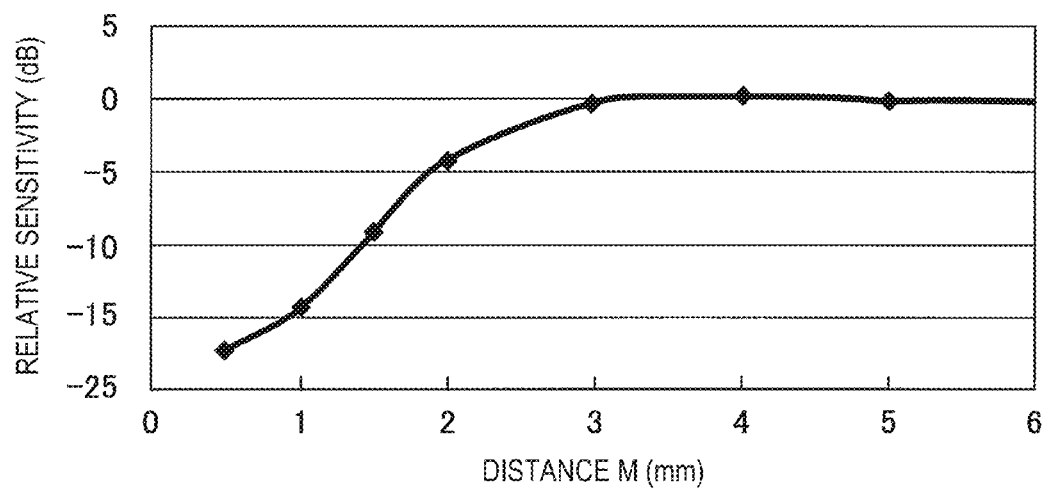
FIG. 10A and FIG. 10B are graphs of measurement data related to the reception performance of a patch antenna.
Figure 10B:
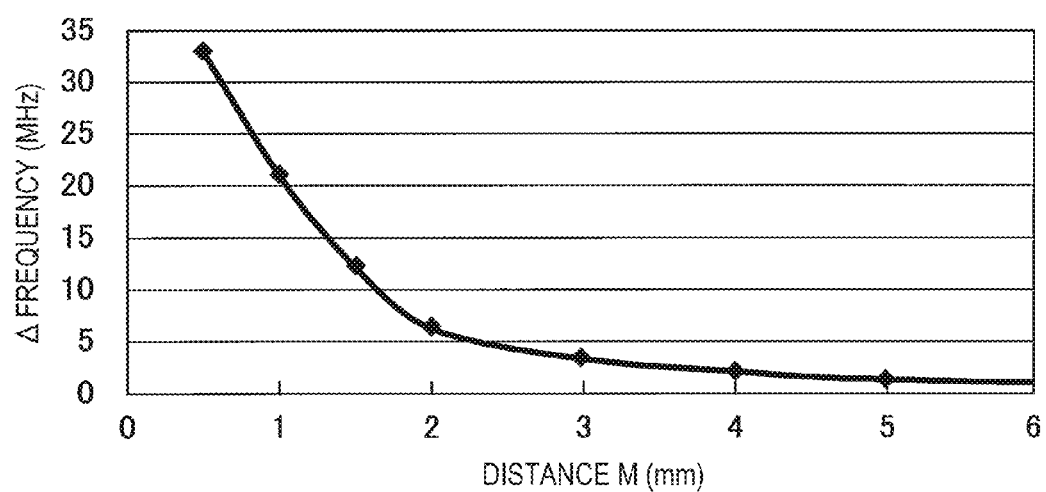

FIG. 10A and FIG. 10B show the results of reception capacity measurements for a patch antenna used as the GPS antenna 27. The thickness L of this patch antenna in the direction perpendicular to the reception surface (that is, the thickness L of the GPS antenna 27 shown in FIG. 7B and FIG. 8B) was 3 mm.

The data in FIG. 10A shows the relationship between the distance M between the patch antenna and a metal member or casing equivalent thereto, and the reception sensitivity to a 1.57542 GHz microwave signal (GPS L1 signal). In FIG. 10A the distance M between the patch antenna and a metal member or casing equivalent thereto is shown on the x-axis, and the reception sensitivity relative to the reception sensitivity when distance M is infinity is shown on the y-axis.

Based on the data shown in FIG. 10A, when the distance M between the patch antenna and a metal member or equivalent casing becomes less than the thickness L (3 mm) (the distance between the radiation electrode on the top of the patch antenna and the antenna circuit board on the bottom surface of the patch antenna) of the patch antenna, current that should normally flow between the radiation electrode on the top of the patch antenna and the circuit board on the bottom surface of the patch antenna electrically couples the radiation electrode on the top of the antenna with the metal member, producing loss, reducing the amount of current that should flow between the electrodes and sharply reducing reception sensitivity. Conversely, when the distance M between the patch antenna and metal member is greater than or equal to the thickness M (3 mm) of the patch antenna, there is substantially no decrease in the reception sensitivity of the patch antenna.

Because electric coupling between the antenna and other metal member or equivalent case member also occurs with other types of antennas, and is not limited to patch antennas, when a metal member or equivalent case member is disposed close to the antenna, reception sensitivity can be assured with no loss of reception sensitivity by assuring at least a specified distance therebetween.

FIG. 10B is a graph showing the relationship between the distance M between the patch antenna and a metal member or equivalent case member, and the difference (variation in the tuning frequency) between 1.57542 GHz (the frequency of the GPS L1 signal) and the frequency at which reception sensitivity is greatest. In FIG. 10B the distance M between the patch antenna and a metal member or casing equivalent thereto is shown on the x-axis, and the variation in the tuning frequency is shown on the y-axis.

Based on the data shown in FIG. 10B, when the distance M between the patch antenna and a metal member or equivalent casing becomes less than the thickness L (3 mm) (the distance between the radiation electrode on the top of the patch antenna and the antenna circuit board on the bottom surface of the patch antenna) of the patch antenna, the induction or capacitance component of the antenna impedance varies due to the presence of a metal member or casing equivalent thereto, and fluctuation in the tuning frequency increases sharply as a result. Conversely, when the distance M between the patch antenna and metal member is greater than or equal to the thickness M (3 mm) of the patch antenna, frequency variation is small.

As shown by the measurement data in FIG. 10A and FIG. 10B, loss of reception sensitivity and frequency variation are extremely small when the distance $M_1$ between the GPS antenna 27 and the transparent electrode 221 and metal electrode 225 of the solar cell 22 shown in FIG. 7B, FIG. 8A, and FIG. 8B is less than or equal to L. More specifically, in order to reliably receive satellite signals, the distance $M_1$ between the GPS antenna 27 and the transparent electrode 221 and metal electrode 225 of the solar cell 22 is preferably less than or equal to L.

As also shown by the measurement data in FIG. 10A and FIG. 10B, the distance $M_2$ between the GPS antenna 27 and case 17 and the distance $M_3$ between the GPS antenna 27 and the movement 13 shown in FIG. 7B are both preferably greater than or equal to L.

Figure 11A:
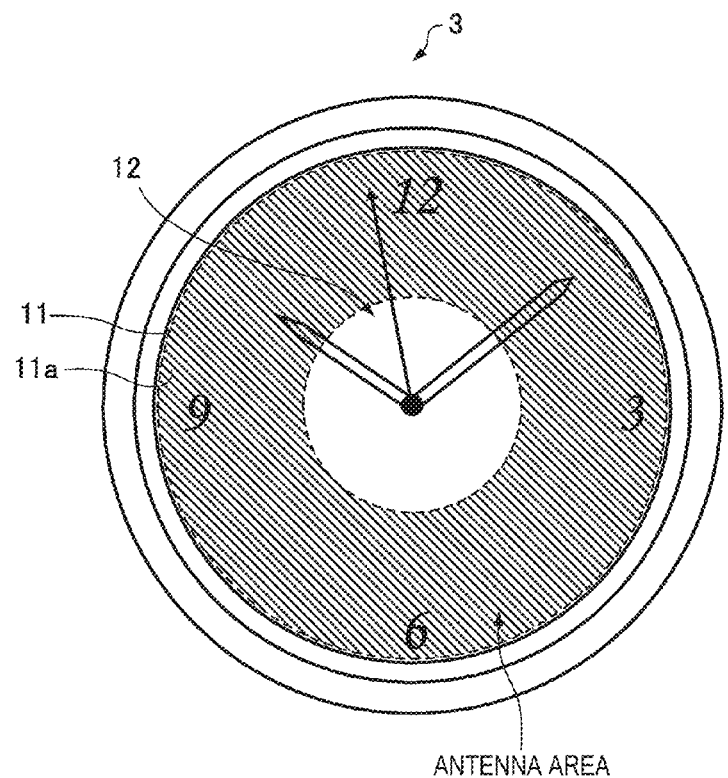
FIG. 11A and FIG. 11B describe an example of the location of the GPS antenna 27 in the first embodiment of the invention.
Figure 11B:
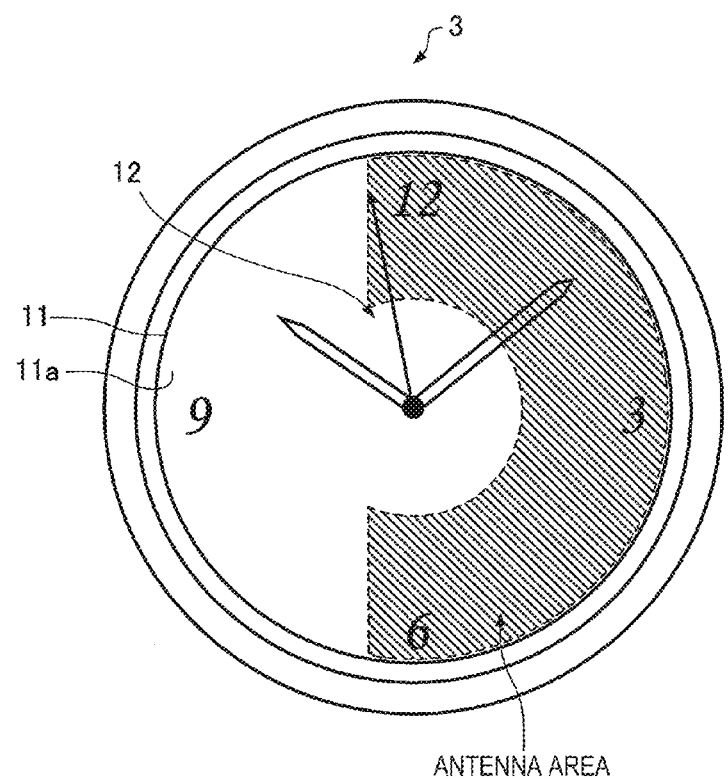

FIG. 11A and FIG. 11B describe other examples of where the GPS antenna 27 is disposed in a GPS wristwatch 3 according to the first embodiment of the invention.

The GPS wristwatch 3 according to the first embodiment of the invention is an analog wristwatch with hands 12, and the hands 12 are disposed in the center of the dial 11 as shown in FIG. 7B. Because the movement 13 that drives the hands 12 is also disposed inside the wristwatch near the center, the GPS antenna 27 is disposed at least in one part near the periphery of the case 17 on the back side 11b of the dial 11 (the shaded area in FIG. 11A). As a result, the radiation pattern of the GPS antenna 27 is blocked by the case 17 and is deflected to the inside as shown in FIG. 9.

As a result, as shown in FIG. 11B, the GPS antenna 27 is preferably disposed at least in a part of the area near the periphery of the case 17 on the back side 11b of the dial 11 (the shaded area in FIG. 11B) in the area corresponding to the range from approximately 12:00 o'clock to approximately 6:00 o'clock on the front (time display surface) 11a of the dial 11 (that is, basically the area on the right half of the dial 11 including the 12, 3, and 6). By disposing the GPS antenna 27 in this area, the radiation pattern of the GPS antenna 27 easily faces the sky where the GPS satellites 10 are present while walking or running when the user wears the GPS wristwatch 3 on the left wrist during everyday use. This is convenient because microwave signals can therefore be easily received.

Effect of Embodiment 1

The distance at which an electromagnetic field incident to a given material attenuates to 1/e is called "skin depth," and the shallower the skin depth, the more resistant a material is to the passage of radio frequencies. The skin depth d of a conductor with permeability µ and conductivity to a signal of frequency f can be determined by the following equation.

$$d = 1/\sqrt{\pi f \mu \sigma} \quad (1)$$

Equation (1) shows that the skin depth d decreases as the signal frequency f increases. More specifically, the higher the frequency f, the greater the resistance to signal passage. High frequency microwave signals thus have a particularly great effect on skin depth. More specifically, because the conductivity of metal materials in particular is high, the skin depth increases. When the skin depth is great, the microwave shield effect also increases. Because the transparent electrode 221 and metal electrode 225 of the solar cell 22 include metallic materials, the shield effect of these members is a significant cause of microwave signal attenuation.

As shown in FIG. 7B, because the solar cell 22 is not disposed between the back side 11b of the dial 11 and the reception surface 27a of the GPS antenna 27 in the GPS wristwatch 3 according to the first embodiment of the invention, microwave signals from the GPS satellites 10 can be reliably received passing as much as possible through the solar cell 22 without being blocked by the solar cell 22. Reliable reception can therefore be maintained even if the GPS antenna 27 is disposed inside the wristwatch on the back side 11b of the dial 11. The GPS wristwatch 3 according to the first embodiment of the invention can therefore alleviate limitations on the antenna location and thereby improve timepiece appearance and wearability.

In addition, as shown in FIG. 7B, the GPS wristwatch 3 according to the first embodiment of the invention disposes the GPS antenna 27 so that the distance $M_1$ to the transparent electrode 221 and metal electrode 225 of the solar cell 22, the distance $M_2$ to the case 17, and the distance $M_3$ to the movement 13 are all greater than or equal to a specified value. Reception becomes more difficult because the radiation pattern of the GPS antenna 27 shrinks as the distance between the GPS antenna 27 and metal members decreases, but the GPS wristwatch 3 according to the first embodiment of the invention can reduce the drop in reception performance because the GPS antenna 27 and other metal members are separated by a distance greater than or equal to a specified value. In addition, if the GPS antenna 27 is disposed so that the distance between the GPS antenna 27 and other metal member is greater than or equal to the thickness L of the GPS antenna 27, the GPS wristwatch 3 according to the first embodiment of the invention can further reduce the drop in reception performance.

As shown in FIG. 11A, the GPS antenna 27 is disposed near the periphery of the case 17 in a GPS wristwatch 3 according to the first embodiment of the invention. In addition, as shown in FIG. 11B, by disposing the GPS antenna 27 on the back side 11b of the dial 11 at least in a part of the area near the periphery in the area corresponding to the range from approximately 12:00 o'clock to approximately 6:00 o'clock on the front 11a of the dial 11, the radiation pattern of the GPS antenna 27 easily faces the sky where the GPS satellites 10 are present while walking or running when the user wears the GPS wristwatch 3 on the left wrist during everyday use. This is convenient because microwave signals can therefore be easily received.

As described above, because reliable reception can be maintained even when the GPS antenna 27 is disposed inside the wristwatch on the back side 11b of the dial 11, the first embodiment of the invention enables providing a GPS wristwatch with a good decorativeness and wearability.

Variations

Figure 12:
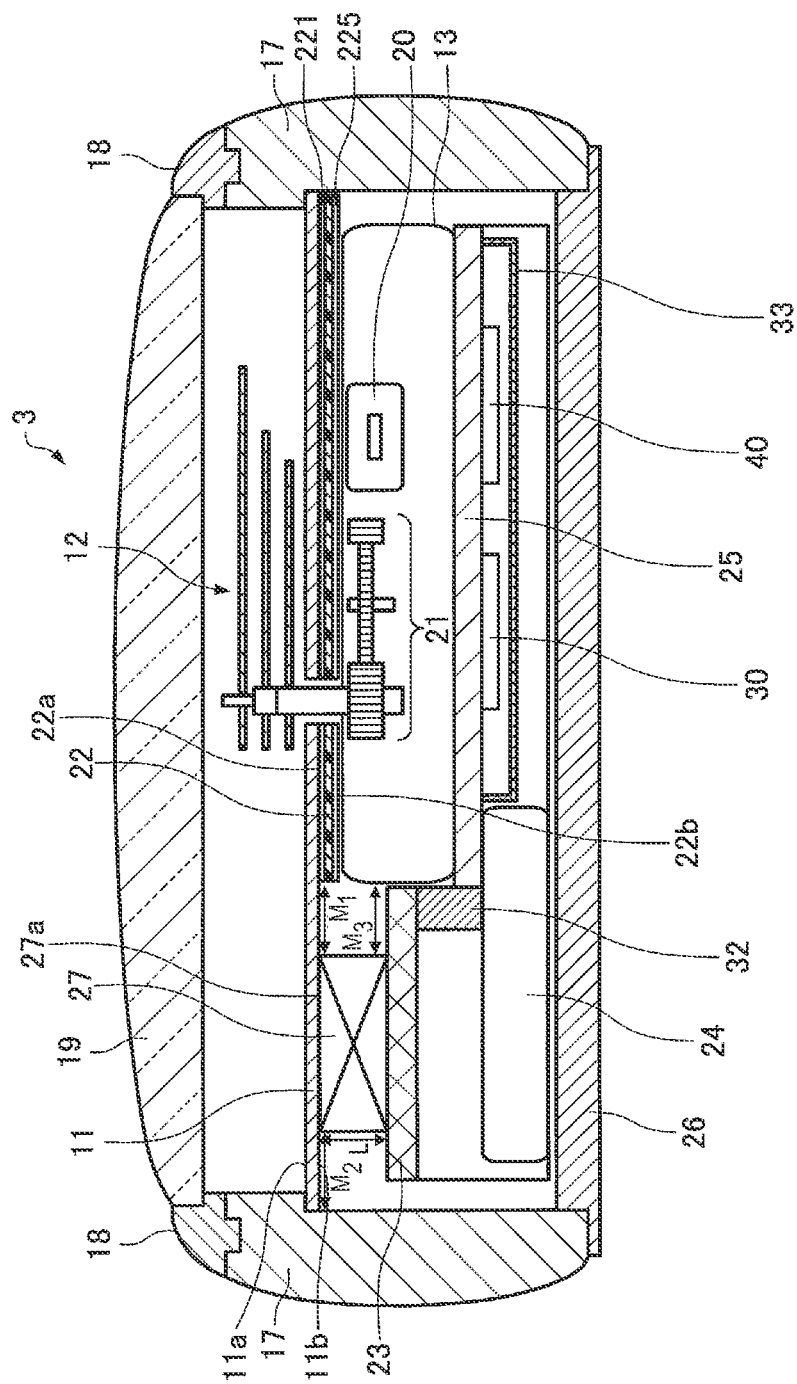
FIG. 12 is a schematic section view showing a variation of the first embodiment of the invention.

FIG. 12 is a schematic section view of a variation of the first embodiment of the invention. Note that like parts are identified by the same reference numerals in FIG. 12 and FIG. 7B.

In this variation of the first embodiment the front (light incidence) side 22a of the solar cell 22 and the reception surface 27a of the GPS antenna 27 are substantially on the same plane.

So that reception performance does not deteriorate greatly, the GPS antenna 27 is disposed so that the distance $M_1$ to the transparent electrode 221 and metal electrode 225 of the solar cell 22 is greater than or equal to a specified value. The GPS antenna 27 is also disposed so that the distance $M_2$ to the case 17 and the distance $M_3$ to the movement 13 are both greater than or equal to a specified value.

Other aspects of the configuration of this variation are the same as in the configuration shown in FIG. 7B, and further description thereof is thus omitted.

The GPS antenna 27 is disposed closer to the crystal 19 in this variation of the first embodiment than in the configuration shown in FIG. 7B. As a result, the radiation pattern of the GPS antenna 27 is more resistant to shielding by the case 17 and the transparent electrode 221 and metal electrode 225 of the solar cell 22. This variation of the invention can therefore improve the reception performance of the GPS antenna 27 more than the GPS wristwatch 3 shown in FIG. 7B.

In this embodiment of the invention the GPS antenna 27 is disposed proximally to the back side 11b of the dial 11. As a result, this also affords greater freedom locating other timepiece parts inside the wristwatch than the configuration shown in FIG. 7B. For example, the case 17 can be rendered thinner and lighter by disposing other timepiece parts with the smallest gaps possible therebetween.

2-2 Embodiment 2

Figure 13:
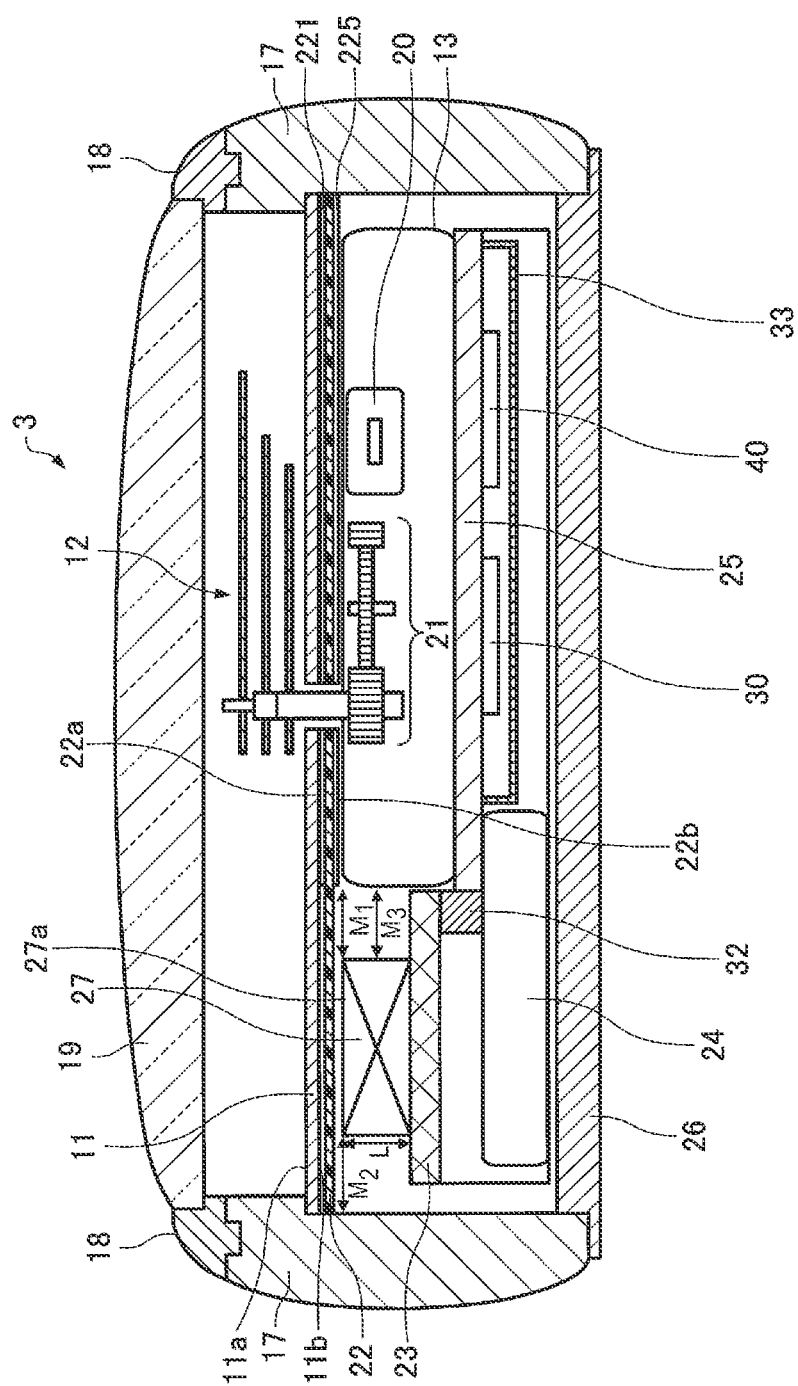
FIG. 13 is a schematic section view of a GPS wristwatch according to a second embodiment of the invention.

FIG. 13 is a schematic section view of a GPS wristwatch 3 according to a second embodiment of the invention. Note that like parts are identified by the same reference numerals in FIG. 13 and FIG. 7B.

In a GPS wristwatch 3 according to the second embodiment of the invention the solar cell 22 is disposed with the front side 22a (the top side as seen in FIG. 13) opposite substantially all of the back side 11b of the dial 11, receives light through the crystal 19 and dial 11, and generates electrical power. In order to improve the appearance and wearability of the GPS wristwatch 3, the GPS antenna 27 is disposed on the back side 11b of the dial 11 with the solar cell 22 therebetween. The GPS antenna 27 is more particularly disposed so that at least a part of the reception surface 27a (the top side in FIG. 13) is opposite at least a part of the back 22b (the surface on the opposite side as the front side 22a) of the solar cell 22. As a result, the GPS antenna 27 receives satellite signals through the crystal 19, dial 11, and solar cell 22.

The microwave shield effect of the transparent electrode 221 and metal electrode 225 of the solar cell 22 is great. As a result, it is difficult for the GPS antenna 27 to receive microwave signals (satellite signals) through the transparent electrode 221 and metal electrode 225 of the solar cell 22. In this embodiment of the invention, therefore, the transparent electrode 221 and metal electrode 225 of the solar cell 22 are not formed at least in the area located between the back side 11b of the dial 11 and the reception surface 27a of the GPS antenna 27. In addition, so that reception performance is not greatly degraded, the GPS antenna 27 is disposed so that the distance $M_1$ to the transparent electrode 221 and metal electrode 225 of the solar cell 22 is a specified value or greater.

The plastic film circuit board 226 may be rendered using metallic materials. If the plastic film circuit board 226 includes metallic materials, it is disposed so that the distance to the GPS antenna 27 is greater than or equal to the specified value.

In addition, as in the first embodiment, the GPS antenna 27 is disposed so that the distance to metal members is greater than or equal to a specified value. More specifically, the GPS antenna 27 is disposed so that the distance $M_2$ to the case 17 and the distance $M_3$ to the movement 13 are both greater than or equal to a specified value. Note that, as described above, when the GPS antenna 27 is a patch antenna, distances $M_1$, $M_2$, and $M_3$ are preferably greater than or equal to the thickness L of the GPS antenna 27.

Other aspects of the configuration of the GPS wristwatch 3 according to the second embodiment of the invention are the same as the GPS wristwatch 3 according to the first embodiment of the invention, and further description thereof is thus omitted.

Figure 14A:
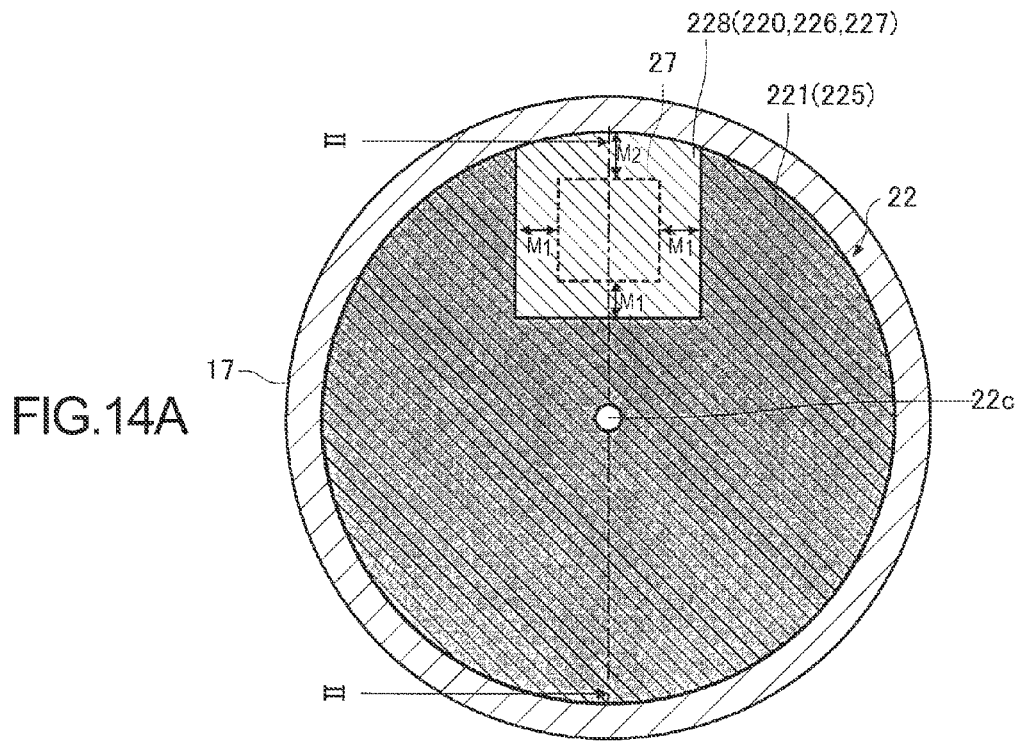
FIG. 14 describes the structure of a solar cell 22 in the second embodiment of the invention.
Figure 14B:
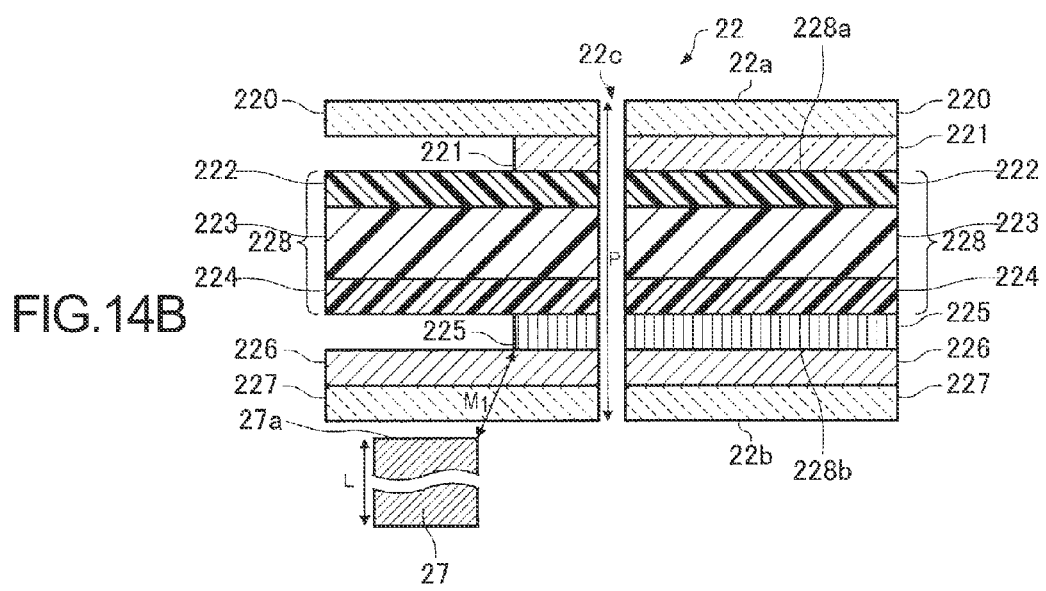

FIG. 14A and FIG. 14B describe the configuration of the solar cell 22 in a GPS wristwatch 3 according to the second embodiment of the invention. FIG. 14A shows the solar cell 22 from the direction in which light is incident (the top in FIG. 13). FIG. 14B is a section view through line II-II of the solar cell 22 shown in FIG. 14A. Note that for illustration purposes the vertical enlargement ratio is greater than the horizontal enlargement ratio in FIG. 14B, but the approximate thickness P of an actual solar cell 22 is several micrometers, and the thickness L of the GPS antenna 27 and the distance $M_1$ between the GPS antenna 27 and the metal electrode 225 of the solar cell 22 are approximately several millimeters. Note that like parts in FIG. 14A, FIG. 14B and FIG. 8A, FIG. 8B are identified by like reference numerals and further description thereof is omitted or simplified.

As shown in FIG. 14A and FIG. 14B, the solar cell 22 has an opening 22c through which the stem of the hands 12 passes. Note that if the GPS wristwatch 3 is a digital wristwatch there are no hands 12 and the opening 22c can therefore be omitted, but because the digital display unit is disposed on the back side of the solar cell 22 a separate opening is required so that the digital display can be seen from the outside.

In order to increase the generating efficiency of the solar cell 22, as much light as possible must be incident to the front surface 228a of the amorphous silicon layer 228. As a result, the surface area of the amorphous silicon layer 228 is preferably as large as possible. However, as described above, because the transparent electrode 221 and metal electrode 225 of the solar cell 22 have a strong microwave shielding effect, the transparent electrode 221 and metal electrode 225 are not disposed in the area between the back side 11b of the dial 11 and the reception surface 27a (the top side as seen in FIG. 14B) of the GPS antenna 27.

In addition, to improve microwave reception performance, the GPS antenna 27 is disposed so that the distance $M_1$ to the transparent electrode 221 and metal electrode 225 of the solar cell 22 and the distance $M_2$ to the case 17 are greater than or equal to a specified value.

Note that because the circuit configuration of the GPS wristwatch 3 according to the second embodiment of the invention is the same as the circuit configuration of the GPS wristwatch 3 according to the first embodiment of the invention shown in FIG. 3, further description thereof is omitted.

Furthermore, because the time adjustment process (in the time mode) and the time difference adjustment process (in the positioning mode) of the GPS wristwatch 3 according to the second embodiment of the invention are the same as the time adjustment process (in the time mode) and the time difference adjustment process (in the positioning mode) of the GPS wristwatch 3 according to the first embodiment shown in FIG. 5 and FIG. 6, further description thereof is omitted.

Yet further, because the configuration of the GPS antenna 27 in the GPS wristwatch 3 according to the second embodiment of the invention is the same as the configuration of the GPS antenna 27 in the GPS wristwatch 3 according to the first embodiment of the invention shown in FIG. 11A and FIG. 11B, further description thereof is omitted.

Effect of Embodiment 2

The effect of a GPS wristwatch 3 according to the second embodiment of the invention is described next.

As shown in FIG. 13, the transparent electrode 221 and metal electrode 225 of the solar cell 22 are not formed in the part thereof that is disposed between the back side 11b of the dial 11 and the reception surface 27a of the GPS antenna 27.

Because the microwave shield effect is weak in the part where the transparent electrode 221 and metal electrode 225 of the solar cell 22 are not formed, reliable reception can be assured by passing microwave signals from the GPS satellites 10 as much as possible without being blocked by the solar cell 22. As a result, reliable reception can be maintained even if the GPS antenna 27 is disposed inside the wristwatch on the back side of the solar cell 22. Therefore, because restrictions on the placement of the antenna can be alleviated by the GPS wristwatch 3 according to the second embodiment of the invention, the appearance and wearability can be improved.

In addition, as shown in FIG. 13, the solar cell 22 is disposed in a GPS wristwatch 3 according to the second embodiment of the invention so that the entire front side 22a of the solar cell 22 opposes the entire back side 11b of the dial 11. Therefore, because the color of the solar cell 22 can be seen throughout the dial 11, decorativeness can be improved. Furthermore, because the area of the front side 22a of the solar cell 22 can be increased, the power generation efficiency of the solar cell 22 can also be increased.

Furthermore, as shown in FIG. 13, in a GPS wristwatch 3 according to the second embodiment of the invention, the GPS antenna 27 is disposed so that the distance $M_1$ to the transparent electrode 221 and metal electrode 225 of the solar cell 22, the distance $M_2$ to the case 17, and the distance $M_3$ to the movement 13 are all greater than or equal to a specified value. More specifically, because the GPS antenna 27 and other metal members are separated by a distance greater than or equal to a specified value in a GPS wristwatch 3 according to the second embodiment of the invention, loss of reception performance can be reduced.

In addition, when the GPS antenna 27 is a patch antenna in a GPS wristwatch 3 according to the second embodiment of the invention, loss of reception performance can be further reduced if the distance between the GPS antenna 27 and metal members is greater than or equal to the thickness L of the GPS antenna 27.

As shown in FIG. 13, the GPS antenna 27 is disposed to a peripheral area near the case 17 in a GPS wristwatch 3 according to the second embodiment of the invention. As in the first embodiment, by disposing the GPS antenna 27 in at least a part of the peripheral area on the back side 11b of the dial 11 opposite the range from 12:00 o'clock to 6:00 o'clock on the front (time display surface) 11a of the dial 11, the radiation pattern of the GPS antenna 27 easily faces the sky where the GPS satellites 10 are present while walking or running when the user wears the GPS wristwatch 3 on the left wrist during everyday use. This is convenient because microwave signals can therefore be easily received.

Reliable reception can therefore be maintained even if the GPS antenna 27 is disposed inside the wristwatch on the back side 11b of the dial 11, and a GPS wristwatch with good appearance and wearability can be provided by means of the second embodiment of the invention.

2-3 Embodiment 3

Figure 15:
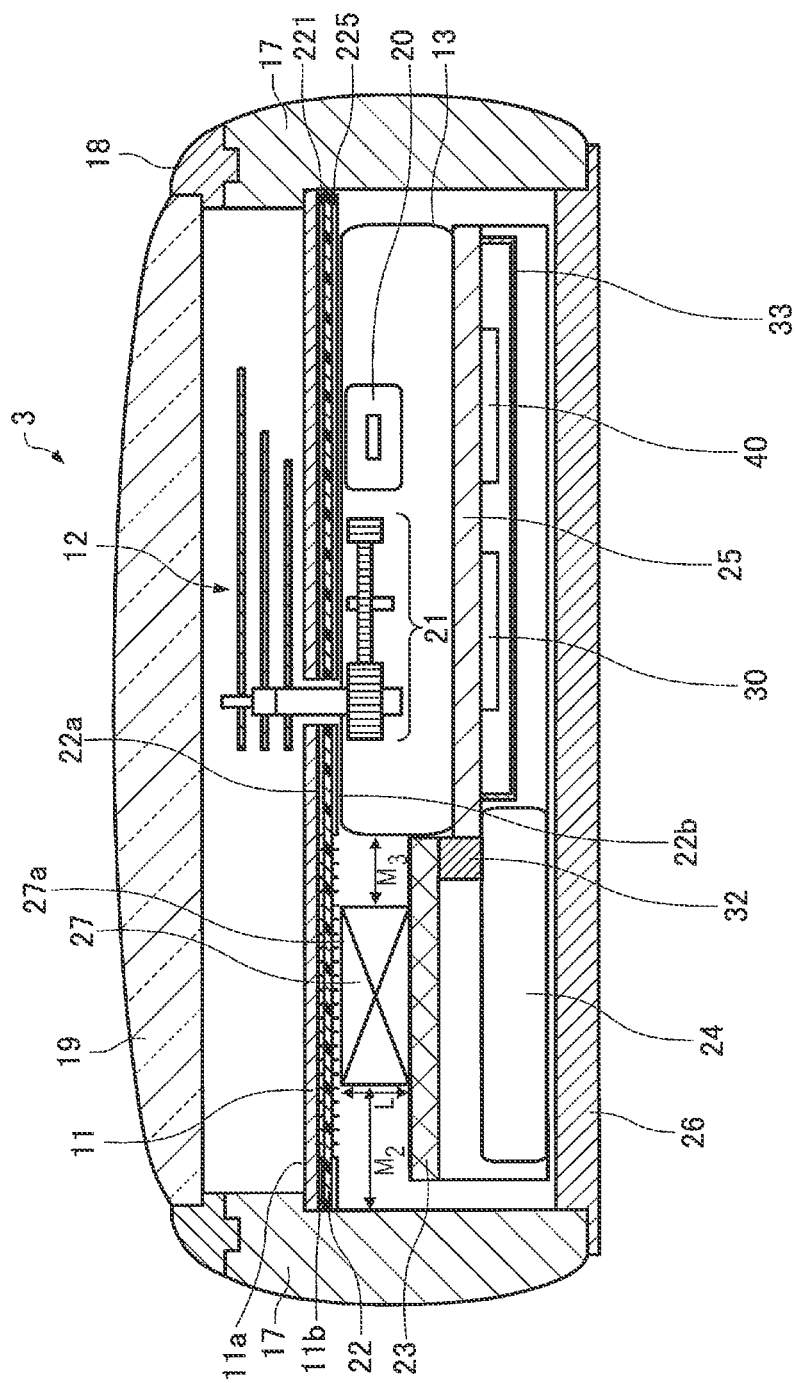
FIG. 15 is a schematic section view of a GPS wristwatch according to a third embodiment of the invention.

FIG. 15 is a schematic section view of a GPS wristwatch 3 according to a third embodiment of the invention. Note that like parts are identified by the same reference numerals in FIG. 15 and FIG. 7B.

In a GPS wristwatch 3 according to the third embodiment of the invention the solar cell 22 is disposed with the front side 22a (the top side as seen in FIG. 15) opposite substantially all of the back side 11b of the dial 11, receives light through the crystal 19 and dial 11, and generates electrical power. In order to improve the appearance and wearability of the GPS wristwatch 3, the GPS antenna 27 is disposed on the back side 11b of the dial 11 with the solar cell 22 therebetween.

In this embodiment of the invention the parts of the transparent electrode 221 and metal electrode 225 of the solar cell 22 near the part of the reception surface 27a of the GPS antenna 27 including the part between the back side 11b of the dial 11 and the reception surface 27a of the GPS antenna 27 (the top in FIG. 15) are rendered with a mesh configuration.

As in the first embodiment and second embodiment, the GPS antenna 27 is disposed so that the distance to metal members is greater than or equal to a specified value. More specifically, the GPS antenna 27 is disposed so that the distance $M_2$ to the case 17 and the distance $M_3$ to the movement 13 are greater than or equal to a specified value. Note that, as described above, if the GPS antenna 27 is a patch antenna, distances $M_1$, $M_2$, and $M_3$ are preferably greater than or equal to the thickness L of the GPS antenna 27.

Other aspects of the configuration of the GPS wristwatch 3 according to the third embodiment of the invention are the same as the GPS wristwatch 3 according to the first embodiment of the invention, and further description thereof is thus omitted.

Figure 16A:
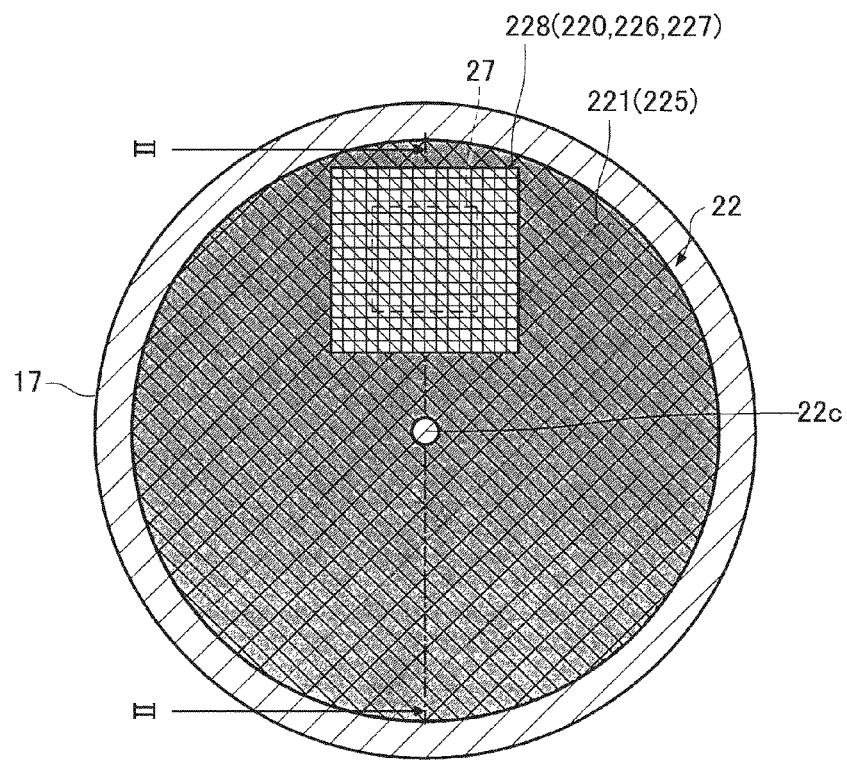
FIG. 16 describes the structure of a solar cell 22 in the second embodiment of the invention.
Figure 16B:
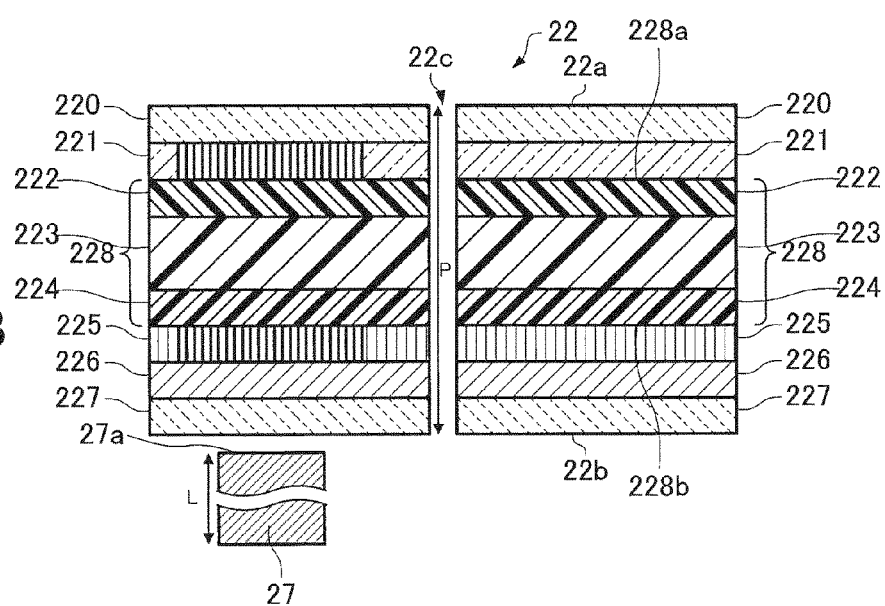

FIG. 16A and FIG. 16B describe the configuration of the solar cell 22 in a GPS wristwatch 3 according to the third embodiment of the invention. FIG. 16A shows the solar cell 22 from the direction in which light is incident (the top in FIG. 15). FIG. 16B is a section view through line II-II of the solar cell 22 shown in FIG. 16A. Note that for illustration purposes the vertical enlargement ratio is greater than the horizontal enlargement ratio in FIG. 16B, but the approximate thickness P of an actual solar cell 22 is several micrometers, and the thickness L of the GPS antenna 27 and the distance $M_1$ between the GPS antenna 27 and the metal electrode 225 of the solar cell 22 are approximately several millimeters. Note that like parts in FIG. 16A, FIG. 16B and FIG. 8A, FIG. 8B are identified by like reference numerals and further description thereof is omitted or simplified.

As shown in FIG. 16A and FIG. 16B, the solar cell 22 has an opening 22c through which the stem of the hands 12 passes. Note that if the GPS wristwatch 3 is a digital wristwatch there are no hands 12 and the opening 22c can therefore be omitted, but because the digital display unit is disposed on the back side of the solar cell 22 a separate opening is required so that the digital display can be seen from the outside.

In order to increase the generating efficiency of the solar cell 22, as much light as possible must be incident to the front surface 228a of the amorphous silicon layer 228. As a result, the surface area of the amorphous silicon layer 228 is preferably as large as possible. In this embodiment of the invention, however, the solar cell 22 is also disposed between the back side 11b of the dial 11 and the reception surface 27a of the GPS antenna 27. However, as described above, because the transparent electrode 221 and metal electrode 225 of the solar cell 22 have a strong microwave shielding effect, the transparent electrode 221 and metal electrode 225 in the area proximal to the reception surface 27a of the GPS antenna 27 (the top as seen in FIG. 16B) have a mesh configuration in this embodiment of the invention.

Note that because the circuit configuration of the GPS wristwatch 3 according to the third embodiment of the invention is the same as the circuit configuration of the GPS wristwatch 3 according to the first embodiment of the invention shown in FIG. 3, further description thereof is omitted.

Furthermore, because the time adjustment process (in the time mode) and the time difference adjustment process (in the positioning mode) of the GPS wristwatch 3 according to the third embodiment of the invention are the same as the time adjustment process (in the time mode) and the time difference adjustment process (in the positioning mode) of the GPS wristwatch 3 according to the first embodiment shown in FIG. 5 and FIG. 6, further description thereof is omitted.

Yet further, because the disposition of the GPS antenna 27 in the GPS wristwatch 3 according to the third embodiment of the invention is the same as the disposition of the GPS antenna 27 in the GPS wristwatch 3 according to the first embodiment of the invention shown in FIG. 11A and FIG. 11B, further description thereof is omitted.

Effect of Embodiment 3

The effect of a GPS wristwatch 3 according to the third embodiment of the invention is described next.

As shown in FIG. 15, in a GPS wristwatch 3 according to the third embodiment of the invention, because the solar cell 22 is formed with the transparent electrode 221 and metal electrode 225 having a mesh configuration in the parts thereof that are proximal to the reception surface 27a of the GPS antenna 27 and include the parts disposed between the back side 11b of the dial 11 and the reception surface 27a of the GPS antenna 27, the area thereof can be reduced. In other words, because attenuation of microwave signals from the GPS satellite 10 by the solar cell 22 can be alleviated, reliable reception can be assured by passing as much as possible through the solar cell 22. Loss caused by electrical coupling with the transparent electrode 221 and metal electrode 225 of the solar cell 22 can also be alleviated. As a result, reliable reception can be maintained even if the GPS antenna 27 is disposed inside the wristwatch on the back side of the solar cell 22. Therefore, because restrictions on the placement of the antenna can be alleviated by the GPS wristwatch 3 according to the third embodiment of the invention, the appearance and wearability can be improved.

The surface area of the transparent electrode 221 and metal electrode 225 of the solar cell 22 is also greater in a GPS wristwatch 3 according to the third embodiment of the invention than in the GPS wristwatch 3 according to the first embodiment of the invention or the second embodiment. The generating efficiency of the solar cell 22 can thus be further increased.

Furthermore, as shown in FIG. 15, in a GPS wristwatch 3 according to the third embodiment of the invention, the GPS antenna 27 is disposed so that the distance $M_2$ to the case 17 and the distance $M_3$ to the movement 13 are greater than or equal to a specified value. More specifically, because the GPS antenna 27 and other metal members are separated by a distance greater than or equal to a specified value in a GPS wristwatch 3 according to the third embodiment of the invention, loss of reception performance can be reduced.

In addition, when the GPS antenna 27 is a patch antenna in a GPS wristwatch 3 according to the third embodiment of the invention, loss of reception performance can be further reduced if the distance between the GPS antenna 27 and metal members is greater than or equal to the thickness L of the GPS antenna 27.

As shown in FIG. 15, the GPS antenna 27 is disposed to a peripheral area near the case 17 in a GPS wristwatch 3 according to the third embodiment of the invention. As in the first embodiment and the second embodiment, by disposing the GPS antenna 27 in at least a part of the peripheral area on the back side 11b of the dial 11 opposite the range from 12:00 o'clock to 6:00 o'clock on the front (time display surface) 11a of the dial 11, the radiation pattern of the GPS antenna 27 can easily face the sky where the GPS satellites 10 are present while walking or running when the user wears the GPS wristwatch 3 on the left wrist during everyday use. This is convenient because microwave signals can therefore be easily received.

Reliable reception can therefore be maintained even if the GPS antenna 27 is disposed inside the wristwatch on the back side 11b of the dial 11, and a GPS wristwatch with good appearance and wearability can be provided by means of the second embodiment of the invention.

2-4 Appearance of a GPS Wristwatch

Figure 17A:
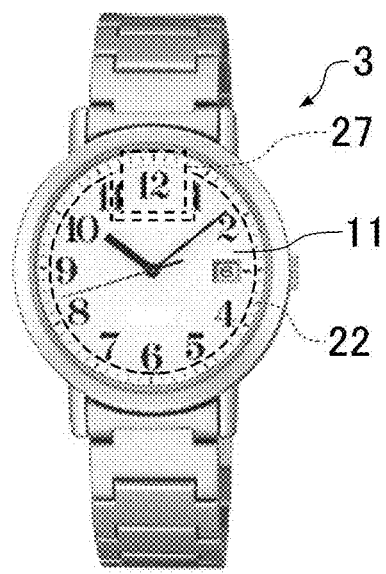
FIG. 17A and FIG. 17B show examples of the appearance of GPS wristwatches according to the first to third embodiments of the invention.
Figure 17B:
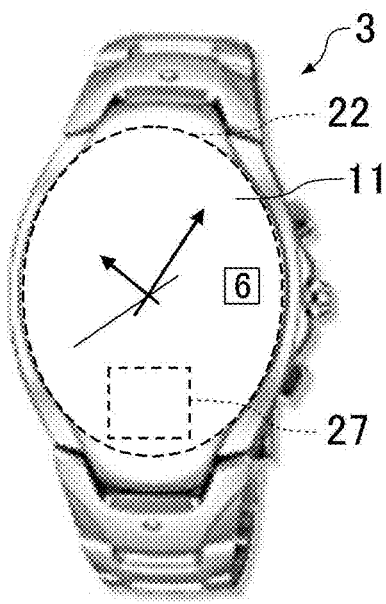

FIG. 17A and FIG. 17B show examples of the appearance of a GPS wristwatch 3 according any of the first to third embodiments described above. As shown in FIG. 17A, for example, the GPS wristwatch 3 may be rendered so that the solar cell 22 is not disposed in the space between the back of the dial 11 and the reception side of the GPS antenna 27 as described in the first embodiment. As shown in FIG. 17B, the GPS wristwatch 3 may also be rendered so that the electrodes of the solar cell 22 are not formed in the part between the back of the dial 11 and the reception side of the GPS antenna 27 as in the second embodiment, or so that the electrodes of the solar cell 22 are mesh shaped in the part between the back of the dial 11 and the reception side of the GPS antenna 27 as in the third embodiment.

The GPS wristwatch 3 according any of the first to third embodiments described above has a good appearance and wearability as shown in FIG. 17A and FIG. 17B because the GPS antenna 27 is disposed on the back side of the dial 11.

In addition, the GPS antenna 27 is disposed behind 12:00 o'clock on the dial 11 shown in FIG. 17A, and behind 6:00 o'clock on the dial 11 shown in FIG. 17B. Therefore, as described in FIG. 11B, the radiation pattern of the GPS antenna 27 in the GPS wristwatch 3 easily faces the sky where the GPS satellites 10 are present as the user walks, runs, and moves about during everyday use. This is convenient because microwave signals can therefore be easily received.

It will be obvious to one with ordinary skill in the related art that the invention is not limited to the foregoing embodiments and can be varied in many ways without departing from the scope of the accompanying claims.

For example, the transparent electrode 221 and metal electrode 225 of the solar cell 22 in the third embodiment are described having a mesh configuration only in the area proximal to the reception surface 27a of the GPS antenna 27, but all of the transparent electrode 221 and metal electrode 225 of the solar cell 22 may be formed with a mesh configuration.

Furthermore, the solar cell 22 in the first embodiment and second embodiment uses a plastic film circuit board 226, but the plastic film circuit board 226 may have a metallic substrate instead. However, because of the microwave shield effect and the loss caused by electrical coupling with the GPS antenna 27 if a metallic substrate is used, the distance to the GPS antenna 27 is preferably greater than or equal to a specified distance.

The solar cell 22 in the third embodiment also uses a plastic film circuit board 226, but the plastic film circuit board 226 may have a metallic substrate instead. If a metallic substrate is used, a mesh or space is preferably rendered in the part of the metallic substrate overlapping the mesh part of the transparent electrode 221 and metal electrode 225 of the solar cell 22.

Yet further, the embodiments of the invention are described above using an analog wristwatch that displays the time using a dial 11 and hands 12 by way of example, but the electronic timepiece of the invention is not limited to wristwatches with an analog time display, and may be a wristwatch with a digital time display that does not have hands 12 and digitally displays the time on the dial 11.

Yet further, the embodiments of the invention are described using a GPS wristwatch by way of example, but the electronic timepiece of the invention is not limited to GPS wristwatches and can be applied to other types of electronic timepieces. Other types of electronic timepieces include, for example, wristwatches that communicate with Bluetooth (R) and CDMA type cell phones and base stations.

The invention includes configurations that are effectively the same as the configurations of the preferred embodiments described above, including configurations with the same function, method, and effect, and configurations with the same object and effect. The invention also includes configurations that replace parts that are not fundamental to the configurations of the preferred embodiments described above. The invention also includes configurations achieving the same operational effect as the configurations of the preferred embodiments described above, as well as configurations that can achieve the same object. The invention also includes configurations that add technology known from the literature to the configurations of the preferred embodiments described above.

What is claimed is:

1. An electronic timepiece that uses electrical power produced by photovoltaic generation as a power source and has a function for receiving microwave signals, comprising:
    a dial for displaying time information on a front surface thereof;
    a solar cell disposed with at least a part of the light-receiving surface opposing at least a part of the back side of the dial that receives light passing through the dial and produces electrical power by photovoltaic generation;
    a patch antenna that is disposed so that at least part of its signal receiving surface opposes at least a part of the back surface of the dial, and receives microwave signals through the dial; and
    a timepiece part of which at least a portion is made from a metallic member;
    wherein the solar cell is not disposed in space between the back side of the dial and the signal receiving surface of the antenna; and
    wherein the timepiece part is disposed so that the distance between the antenna and the timepiece part is greater than or equal to the thickness of the antenna in the direction perpendicular to the signal receiving surface.

2. The electronic timepiece described in claim 1, wherein:
    the solar cell has an open part formed in the space between the back side of the dial and the signal receiving surface of the antenna.

3. The electronic timepiece described in claim 2, wherein:
    the light-receiving surface of the solar cell and the signal receiving surface of the antenna are disposed substantially on the same plane.

4. The electronic timepiece described in claim 1, wherein:
    the distance between the antenna and metallic members contained in the solar cell is greater than or equal to a specified value.

5. The electronic timepiece described in claim 1, wherein:
    the timepiece parts include an outside case member, a movement, and a back cover.

6. The electronic timepiece described in claim 1, wherein:
    the solar cell is disposed with the light-receiving surface opposing substantially all of the back side of the dial.

7. The electronic timepiece described in claim 1, wherein:
the antenna is disposed to at least a part of a peripheral part on the back side of the dial.

8. The electronic timepiece described in claim 7, wherein:
the peripheral part is on the back side corresponding to a position from 12:00 o'clock to 6:00 o'clock on the face of the dial.

9. The electronic timepiece described in claim 1, wherein:
the microwave signals are satellite signals transmitted from a positioning information satellite,
the electronic timepiece further comprising:
a time adjustment information generating unit that acquires satellite information from a satellite signal received by the antenna and generates time adjustment information based on the satellite information, and
a time information adjustment unit that adjusts the time information based on the time adjustment information.

10. An electronic timepiece that uses electrical power produced by photovoltaic generation as a power source and has a function for receiving microwave signals, comprising:

a dial for displaying time information on a front surface thereof;

a solar cell disposed with at least a part of the light-receiving surface opposing at least a part of the back side of the dial that receives light passing through the dial and produces electrical power by photovoltaic generation; and a patch antenna that is disposed so that at least part of its signal receiving surface opposes at least a part of the back surface of the dial, and receives microwave signals through the dial;

wherein the solar cell is not disposed in space between the back side of the dial and the signal receiving surface of the antenna, and wherein the distance between the antenna and metallic members contained in the solar cell is greater than or equal to the thickness of the antenna in the direction perpendicular to the signal receiving surface.

* * * * *